US012538055B2

(12) United States Patent
Yoshioka et al.

(10) Patent No.: US 12,538,055 B2
(45) Date of Patent: Jan. 27, 2026

(54) DISPLAY APPARATUS, OUTPUT METHOD, AND DISPLAY MODULE

(71) Applicant: Sony Group Corporation, Tokyo (JP)

(72) Inventors: Hiroshi Yoshioka, Kanagawa (JP); Yoshio Ohashi, Kanagawa (JP)

(73) Assignee: Sony Group Corporation (JP)

( * ) Notice: Subject to any disclaimer, the term of this patent is extended or adjusted under 35 U.S.C. 154(b) by 137 days.

(21) Appl. No.: 18/281,867

(22) PCT Filed: Jan. 26, 2022

(86) PCT No.: PCT/JP2022/002776
§ 371 (c)(1),
(2) Date: Sep. 13, 2023

(87) PCT Pub. No.: WO2022/209225
PCT Pub. Date: Oct. 6, 2022

(65) Prior Publication Data
US 2024/0155273 A1 May 9, 2024

(30) Foreign Application Priority Data
Mar. 31, 2021 (JP) ................................ 2021-059263

(51) Int. Cl.
*H04R 1/02* (2006.01)
*H04R 3/04* (2006.01)
(Continued)

(52) U.S. Cl.
CPC ................. *H04R 1/02* (2013.01); *H04R 3/04* (2013.01); *H04R 7/06* (2013.01); *H04R 17/00* (2013.01); *H04R 2499/15* (2013.01)

(58) Field of Classification Search
CPC ... H04R 1/02; H04R 3/04; H04R 7/06; H04R 17/00; H04R 2499/15
(Continued)

(56) References Cited

U.S. PATENT DOCUMENTS 6,137,890 A * 10/2000 Markow .................. H04R 3/00 381/306
2018/0343522 A1* 11/2018 Choi ...................... H04N 5/642
(Continued)

FOREIGN PATENT DOCUMENTS

JP 59-145327 9/1984
JP S61-60597 U 4/1986
(Continued)

OTHER PUBLICATIONS

International Search Report for PCT/JP2022/002776, mailed Mar. 15, 2022, 3 pages.

*Primary Examiner* — Suhan Ni
(74) *Attorney, Agent, or Firm* — Lerner David LLP

(57) ABSTRACT

The present technology relates to a display apparatus, an output method, and a display module that can create a sense of integration between images and sound.
The display apparatus of the present technology includes a display unit that is configured to display an image and that includes display modules combined, the display modules each including multiple light source substrates, and a screen vibration sound output unit configured to vibrate the light source substrates or the display modules from a back side by a vibrator, thereby allowing the display unit to output sound. The vibrator includes a piezoelectric actuator. The present technology can be applied to display apparatuses including large screen display units such as LED displays, for example.

10 Claims, 24 Drawing Sheets

(51) Int. Cl.
*H04R 7/06* (2006.01)
*H04R 17/00* (2006.01)

(58) Field of Classification Search
USPC .......................................................... 381/190
See application file for complete search history.

(56) References Cited

U.S. PATENT DOCUMENTS

| | | | | |
|---|---|---|---|---|
| 2020/0374634 | A1* | 11/2020 | Ohashi | G09F 9/301 |
| 2021/0004198 | A1* | 1/2021 | Ha | G06F 3/16 |
| 2021/0076115 | A1 | 3/2021 | Choi | |

FOREIGN PATENT DOCUMENTS

| | | | |
|---|---|---|---|
| JP | 2010093769 | A | 4/2010 |
| JP | 2012235426 | A | 11/2012 |
| JP | 2013207796 | A | 10/2013 |
| JP | 2014175776 | A | 9/2014 |
| JP | 2017063279 | A | 3/2017 |
| JP | 2018007247 | A | 1/2018 |
| JP | 2021012369 | A | 2/2021 |
| WO | 2019111775 | A1 | 6/2019 |
| WO | 2021014933 | A1 | 1/2021 |

* cited by examiner

DISPLAY APPARATUS, OUTPUT METHOD, AND DISPLAY MODULE

CROSS-REFERENCE TO RELATED APPLICATIONS

This application is a national phase entry under 35 U.S.C. § 371 of International Application No. PCT/JP2022/002776 filed Jan. 26, 2022, which claims the priority from Japanese Patent Application No. 2021-059263 filed in the Japanese Patent Office on Mar. 31, 2021, the entire contents of which are hereby incorporated by reference.

TECHNICAL FIELD

The present technology relates to a display apparatus, an output method, and a display module, in particular, to a display apparatus, an output method, and a display module that can create a sense of integration between images and sound.

BACKGROUND ART

In display apparatuses including large screen display units such as LED displays, speakers are sometimes placed on the back or around the display unit (such as the lower portion of the screen).

CITATION LIST

Patent Literature

[PTL 1]
Japanese Patent Laid-open No. 2012-235426

SUMMARY

Technical Problem

In this case, in the case where the speakers are placed on the back, the sound output from the speakers is blocked by the display unit, and in the case where the speakers are placed around the display unit, the sound is heard from outside the screen. Thus, viewers cannot have an integrated audiovisual experience where the viewers feel that the sources of images and sound match.

The present technology has been made in view of such a circumstance and makes it possible to create a sense of integration between images and sound.

Solution to Problem

A display apparatus according to a first aspect of the present technology includes a display unit that is configured to display an image and that includes display modules combined, the display modules each including multiple light source substrates, and a screen vibration sound output unit configured to vibrate the light source substrates or the display modules from a back side by a vibrator, thereby allowing the display unit to output sound.

A display module according to a second aspect of the present technology includes an image display unit including multiple light source substrates combined, and a screen vibration sound output unit configured to vibrate the light source substrates from a back by a vibrator, thereby allowing the image display unit to output sound.

In the first aspect of the present technology, an image is displayed by a display unit including display modules which are combined and each of which includes multiple light source substrates, and the light source substrates or the display modules are vibrated from a back side by a vibrator, thereby allowing the display unit to output sound.

In the second aspect of the present technology, a light source substrate is vibrated from a back side by a vibrator, thereby allowing an image display unit including the light source substrate in plural number in a combined manner to output sound.

DESCRIPTION OF EMBODIMENT

Now, a mode for carrying out the present technology is described. Description is given in the following order.

1. External Appearance of Display Apparatus
2. Configuration of Display Apparatus
3. Modified Example

1. EXTERNAL APPEARANCE OF DISPLAY APPARATUS

Exemplary External Appearance of Display Apparatus

Figure 1:
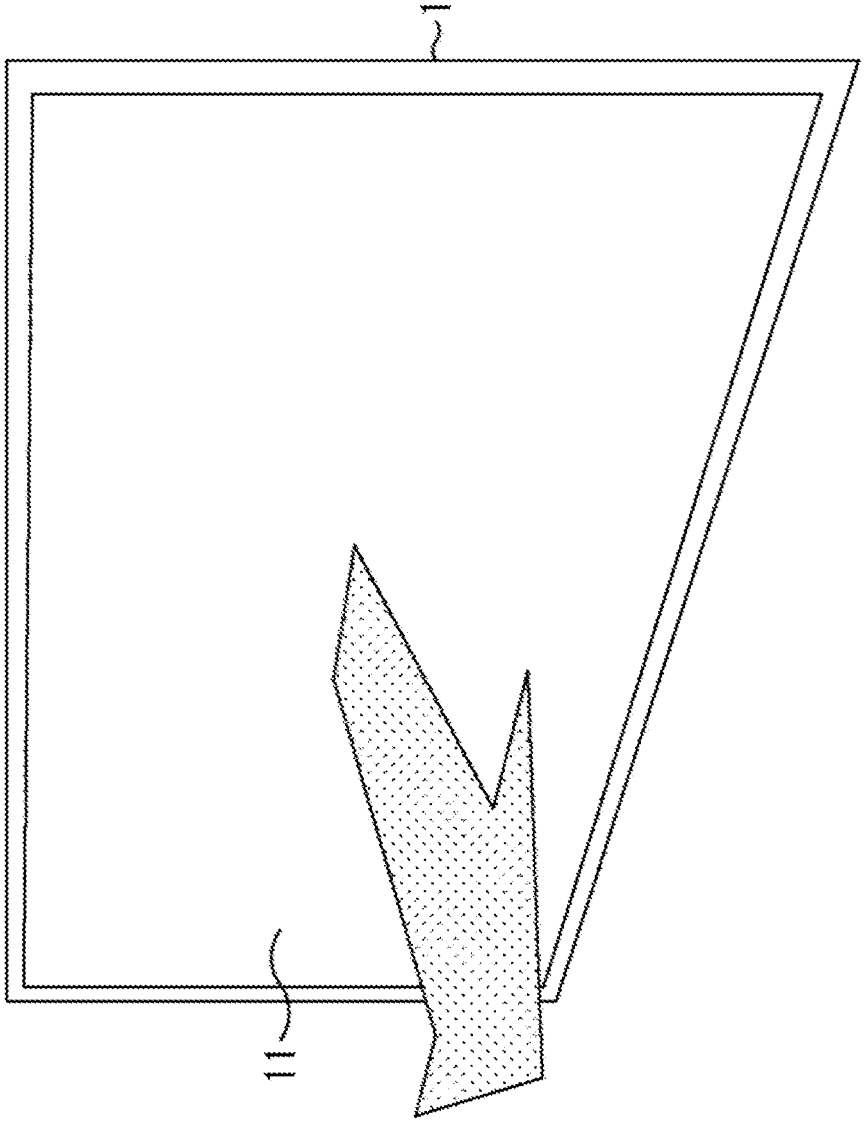
FIG. 1 is a view illustrating an external appearance of a display apparatus to which the present technology is applied.

FIG. 1 is a view illustrating an external appearance of a display apparatus 1 to which the present technology is applied. FIG. 1 illustrates the external appearance of the display apparatus 1 when viewed from a diagonal front perspective.

In the example of FIG. 1, the display apparatus 1 includes a display unit 11, which is an LED (Light Emitting Diode) display, with its upper, lower, left, and right sides surrounded by a narrow frame member. The display apparatus 1 may include the display unit 11 that is not surrounded by a frame member.

The display apparatus 1 outputs images and sound obtained by reproduction of video content, for example. In the display apparatus 1, images are displayed on the display unit 11. Further, as indicated by an arrow in FIG. 1, sound is output from the display unit 11 itself. The output of sound using the display unit 11 is achieved by vibration of the display unit 11 as described later.

Figure 2:
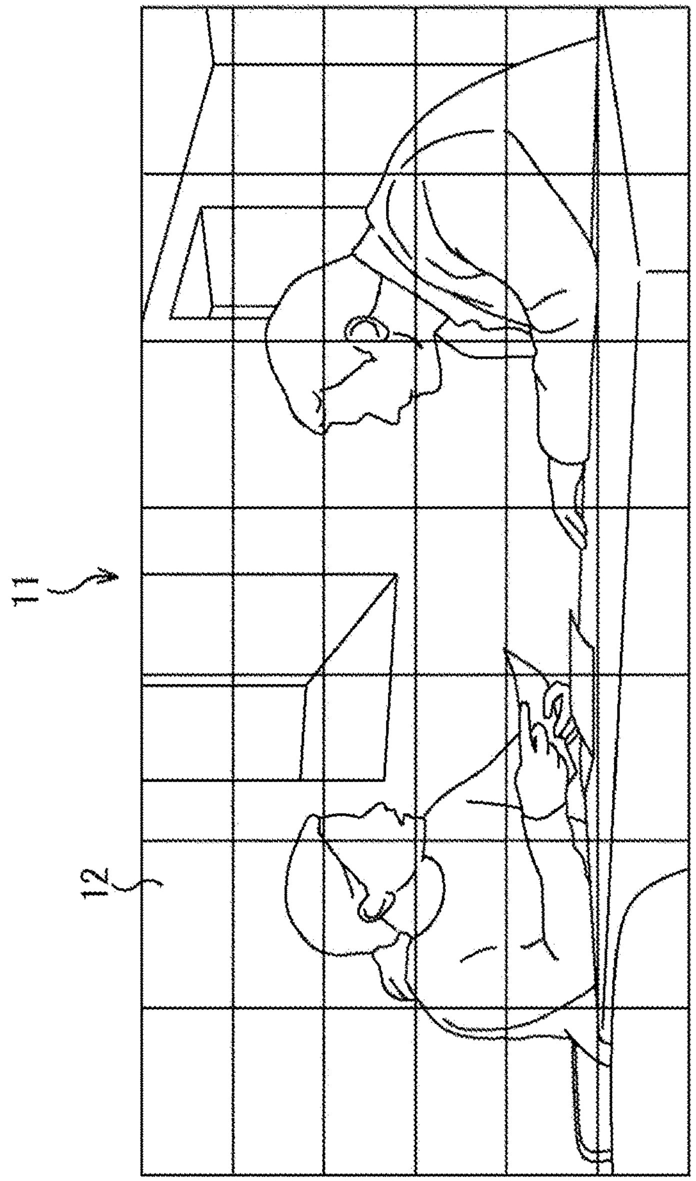
FIG. 2 is a front view illustrating a configuration example of a display unit.

FIG. 2 is a front view illustrating a configuration example of the display unit 11.

As indicated by the solid separation lines, the display unit 11 includes multiple display modules 12 vertically and horizontally arranged and combined.

In the example of FIG. 2, the display unit 11 includes the 42 combined horizontal rectangular display modules 12 in total with the seven display modules 12 in each row in the horizontal direction and the six display modules 12 in each column in the vertical direction. The number of the display modules 12 of the display unit 11 can appropriately be changed depending on the size of the display apparatus 1. The display apparatus 1 is a scalable display system including any number of the display modules 12 combined.

The surface of each of the display modules 12 serves as an image display unit. Instead of the same image being displayed on each image display unit, as illustrated in FIG. 2, for example, an image is displayed with all the multiple image display units being used as a single display surface.

Exemplary Configuration of Display Module 12

Figure 3:
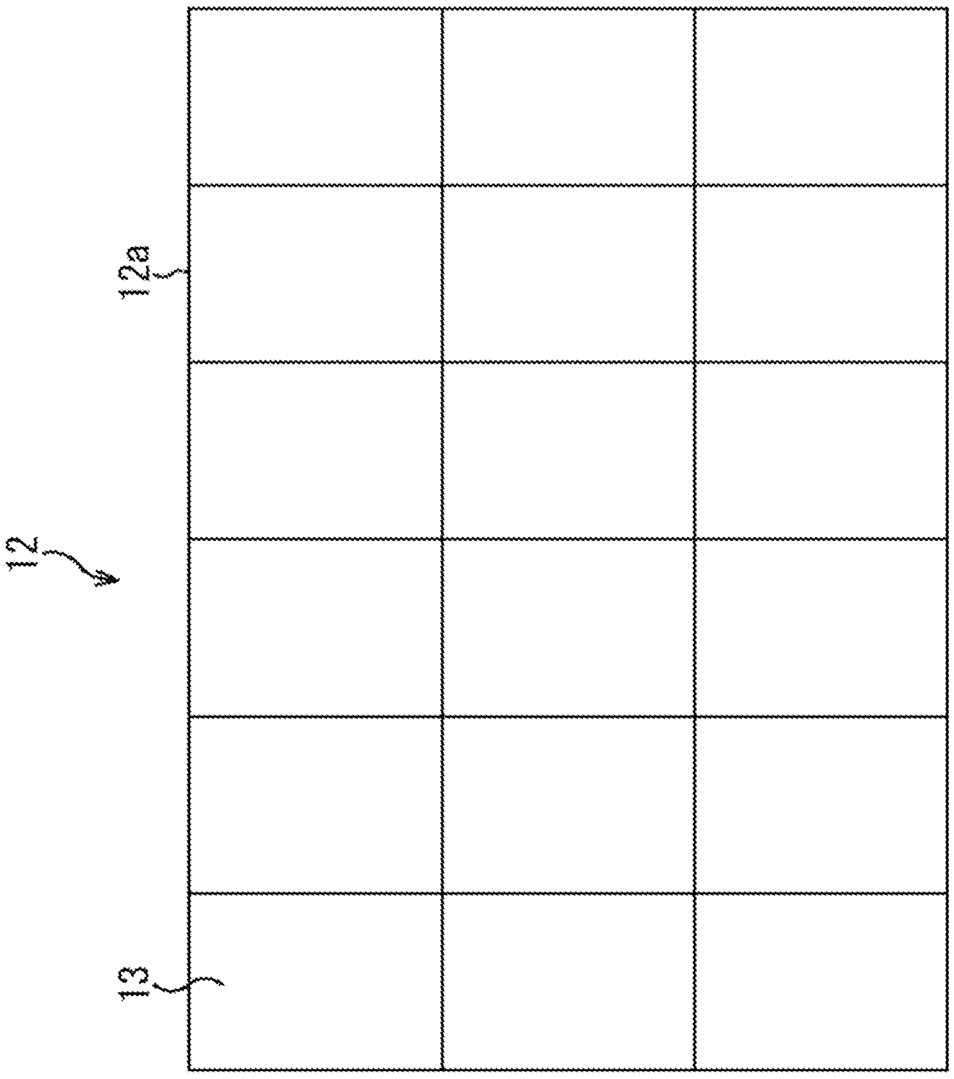
FIG. 3 is a diagram illustrating a single display module in an enlarged manner.

FIG. 3 is a diagram illustrating the single display module 12 in an enlarged manner.

As illustrated in FIG. 3, an image display unit 12*a* of the display module 12 includes multiple LED substrates 13 vertically and horizontally arranged and combined. The LED substrate 13 is a substrate on which fine RGB LEDs, which serve as light source elements, are placed at predetermined intervals over the entire front surface of the substrate. In the example of FIG. 3, the image display unit 12*a* includes the 18 combined vertical rectangular LED substrates 13 in total with the six LED substrates 13 in each row in the horizontal direction and the three LED substrates 13 in each column in the vertical direction. The number of the LED substrates 13 of the single display module 12 can also appropriately be changed.

First Vibration Mechanism (Example in which LED Substrate is Vibrated)

Figure 4:
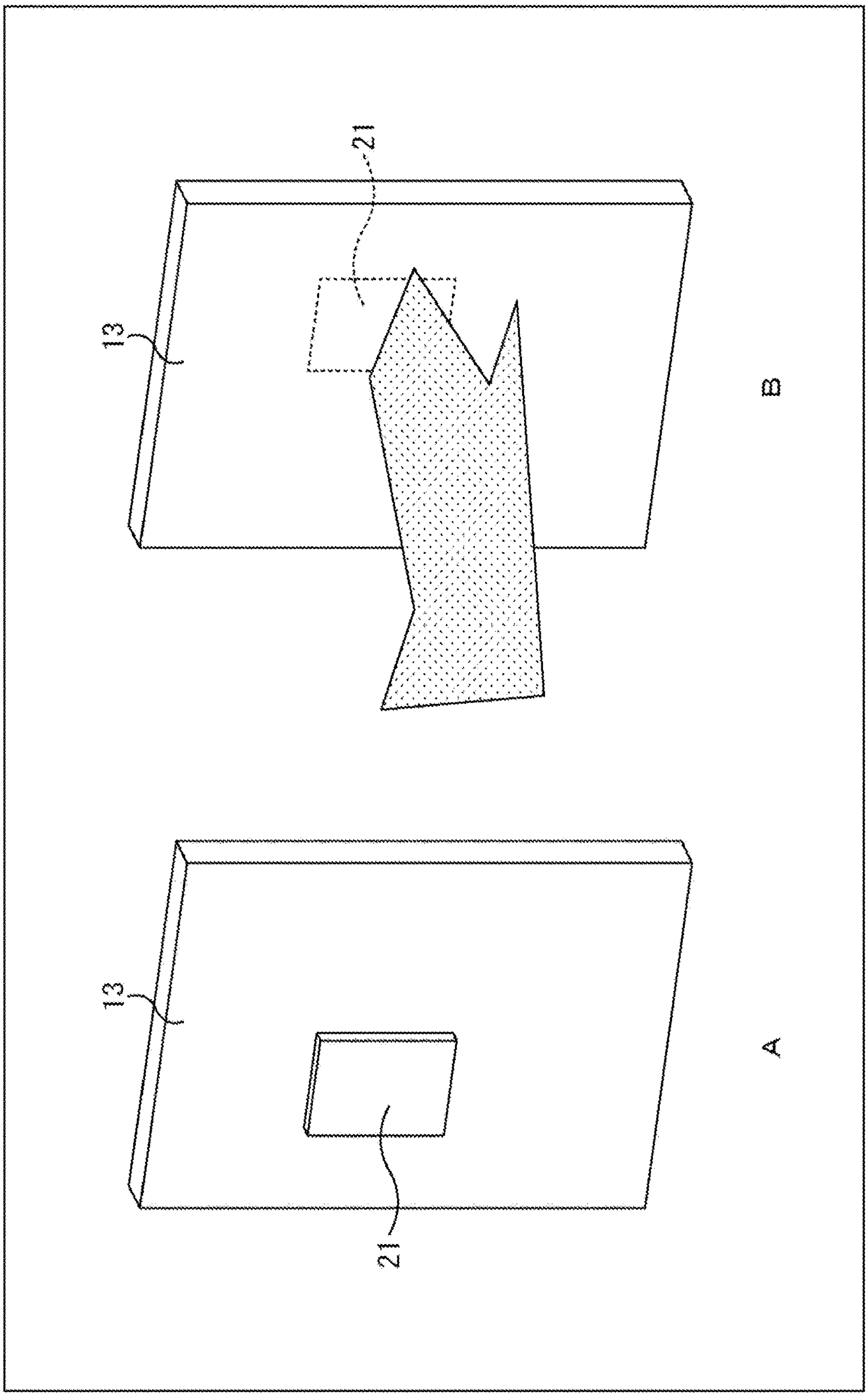
FIG. 4 depicts diagrams illustrating a first vibration mechanism.

FIG. 4 depicts diagrams illustrating a first vibration mechanism. In FIG. 4, A illustrates the back side of the LED substrate 13, and B illustrates the front side of the LED substrate 13.

As illustrated in A of FIG. 4, a thin plate-shaped vibrator 21 is provided on the back of the LED substrate 13 with a thin plate shape. In A of FIG. 4, the vibrator 21 is provided at a position slightly shifted to the left from the center of the LED substrate 13.

The vibrator 21 includes a planar stacked piezoelectric actuator, an electromagnetic actuator, or the like. When the vibrator 21 vibrates in response to a sound signal, the vibration is transmitted to the LED substrate 13. By the vibrator 21 directly vibrating the LED substrate 13, as illustrated in B of FIG. 4, sound is output with the display surface of the LED substrate 13 serving as the radiating surface. This makes it possible for the LED substrate 13 to function as a planar speaker.

Figure 5:
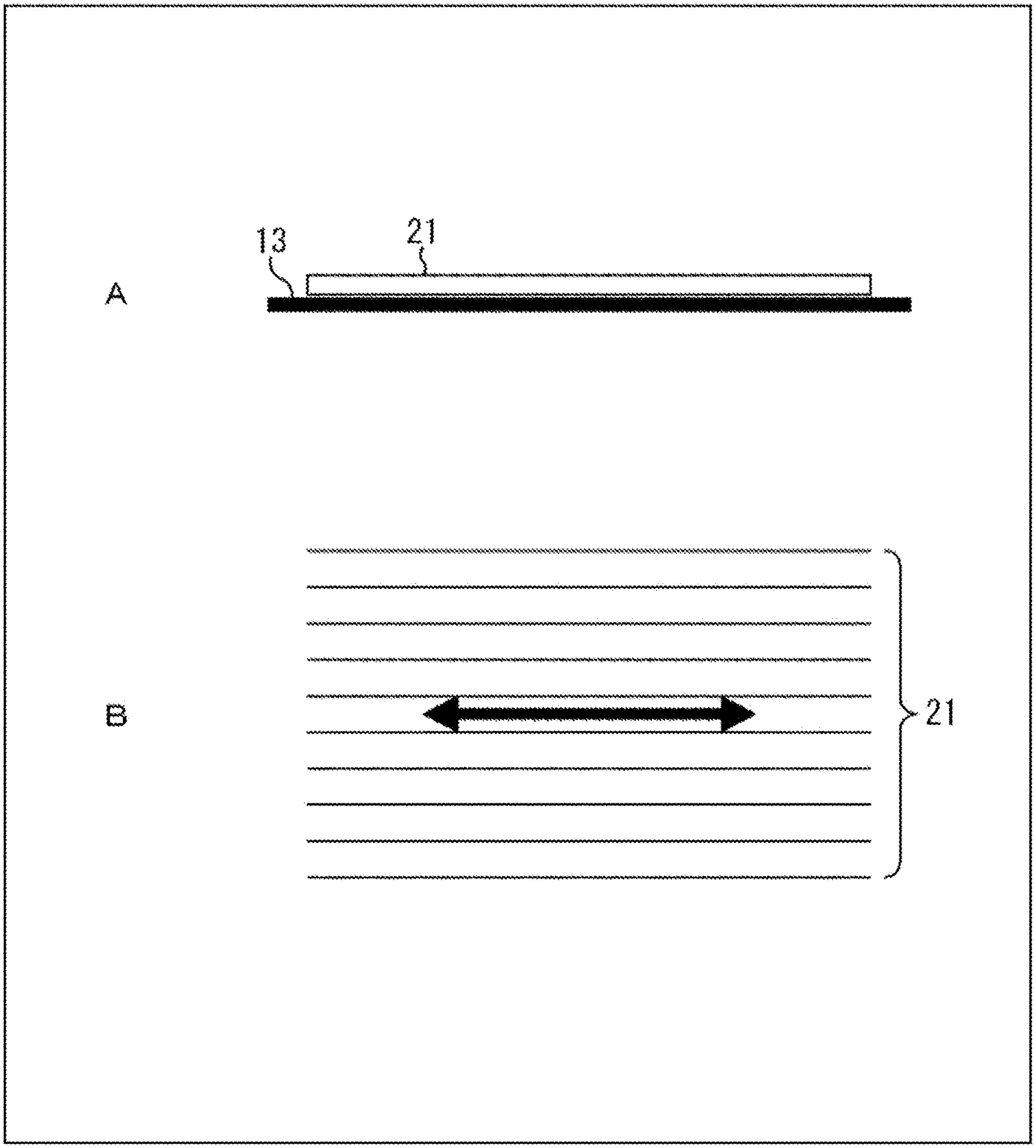
FIG. 5 depicts diagrams illustrating a configuration example of a vibrator.

FIG. 5 depicts diagrams illustrating a configuration example of the vibrator 21.

Figure 6:
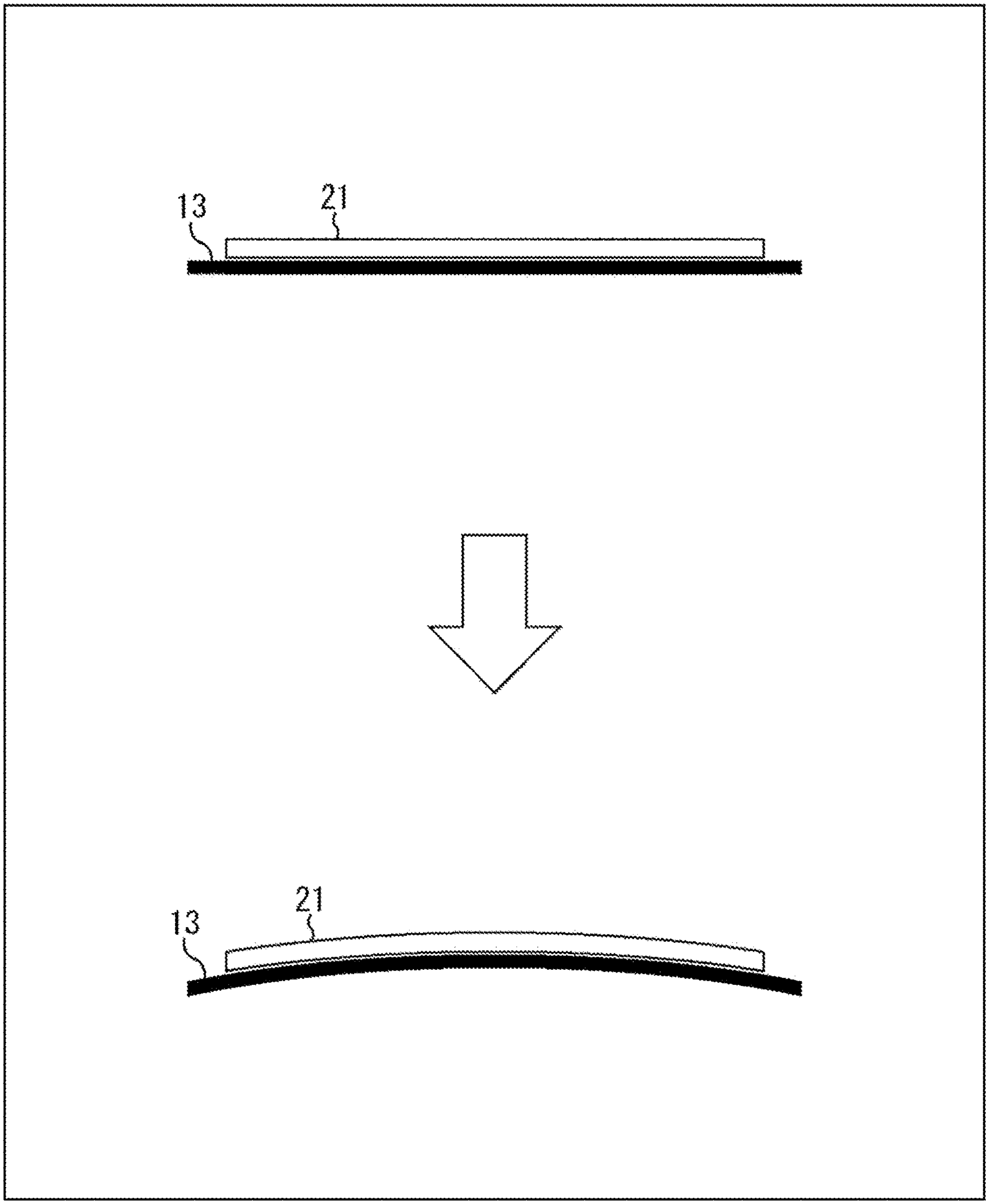
FIG. 6 is a diagram illustrating an exemplary vibration method for the vibrator.

A monomorph planar stacked piezoelectric actuator that serves as the vibrator 21 directly fixed to the back of the LED substrate 13 as illustrated in A of FIG. 5 includes, for example, multiple ceramic layers stacked, as illustrated in B of FIG. 5 in a partially enlarged manner. When each ceramic layer elongates, as schematically illustrated in FIG. 6, the planar stacked piezoelectric actuator and the LED substrate 13 deform together with the LED substrate 13 serving as the fixed end.

Figure 7:
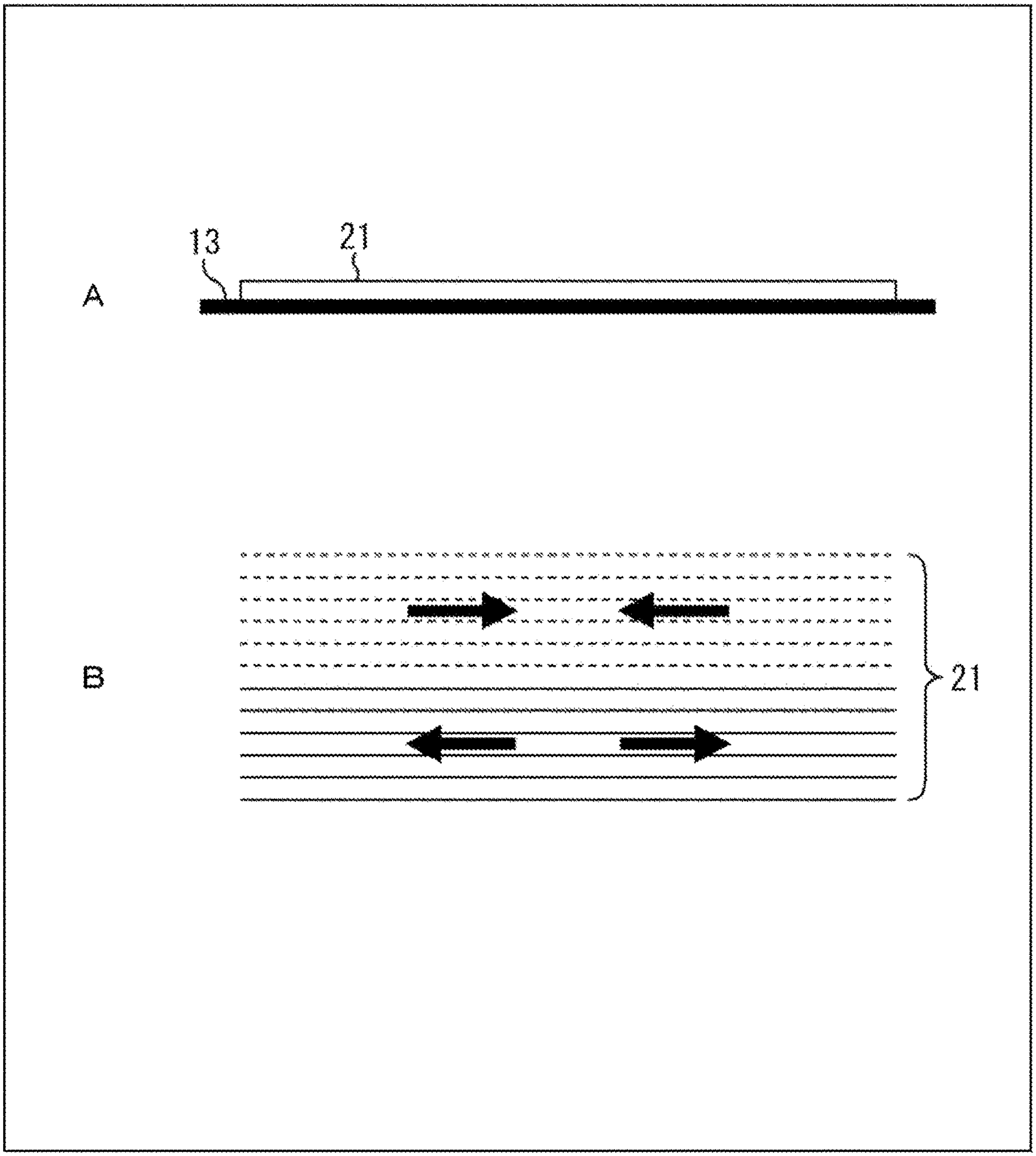
FIG. 7 depicts diagrams illustrating another configuration example of the vibrator.

FIG. 7 depicts diagrams illustrating another configuration example of the vibrator 21.

A bimorph planar stacked piezoelectric actuator that serves as the vibrator 21 illustrated in A of FIG. 7 also includes, for example, multiple ceramic layers stacked, as illustrated in B of FIG. 7 in a partially enlarged manner, similarly to the monomorph planar stacked piezoelectric actuator. When the ceramic layers indicated by the solid lines elongate and the ceramic layers indicated by the dashed lines contract, the planar stacked piezoelectric actuator deforms. The deformation of the planar stacked piezoelectric actuator is transmitted to the LED substrate 13.

As described above, since sound is output from the display unit 11 itself, which includes the LED substrate 13, the display apparatus 1 can provide a viewer with an experience as if sound were emitted from the person or object appearing in the image displayed on the display unit 11. That is, the display apparatus 1 can create a sense of integration between images and sound.

Figure 8:
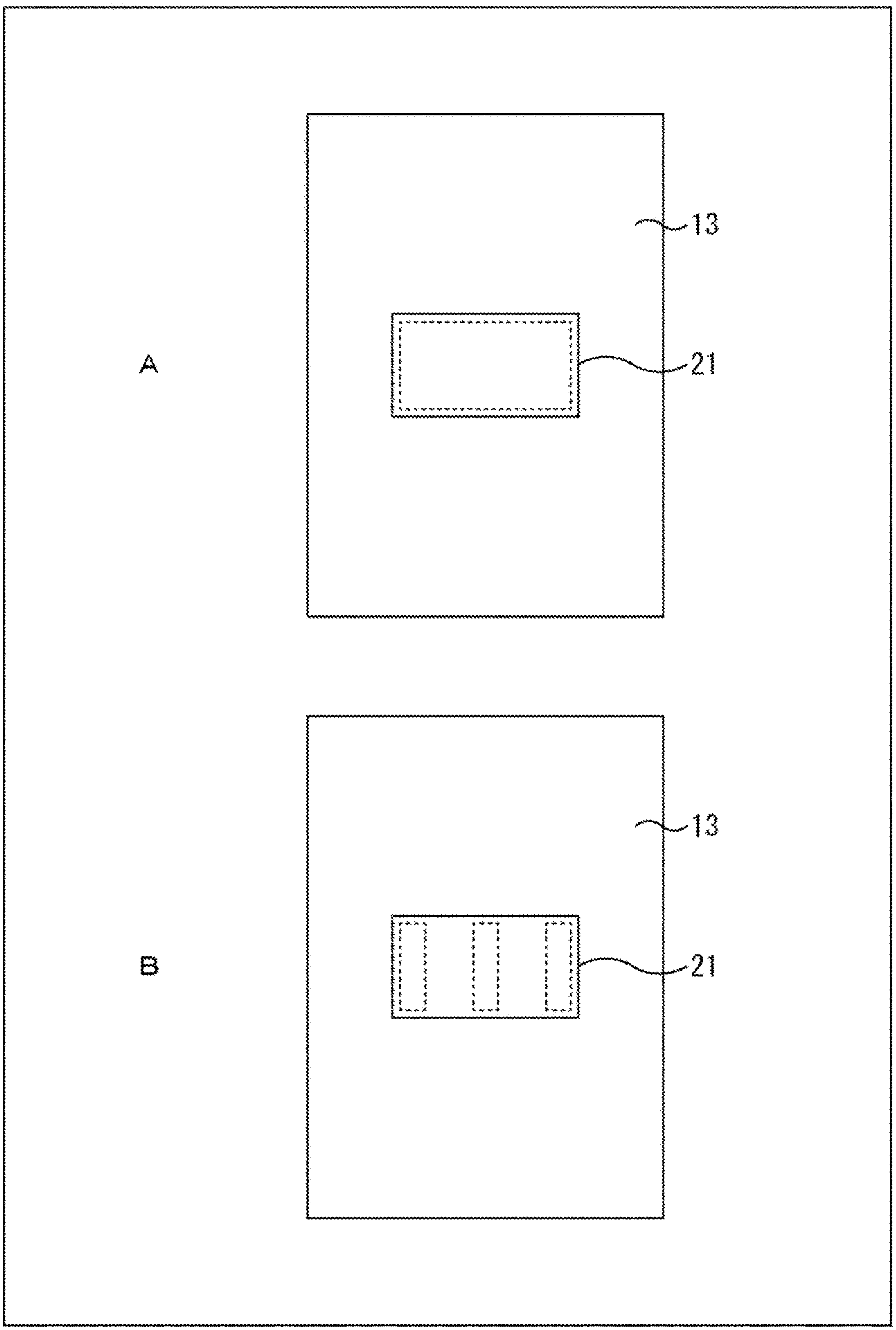
FIG. 8 depicts diagrams illustrating exemplary fixation methods for the vibrator.

FIG. 8 depicts diagrams illustrating exemplary fixation methods for the vibrator 21. For the sake of convenience in description, in FIG. 8, the vibrator 21 is illustrated at the center of the LED substrate 13.

In the example of A of FIG. 8, the vibrator 21 is fixed to the LED substrate 13 with the substantially entire surface of one side of the vibrator 21 being attached with double-sided tape or the like. The area indicated by the dashed line represents the area of attachment. Fixing the entire surface of one side of the vibrator 21 makes it possible to effectively transmit the force generated by the vibration of the vibrator 21 to the LED substrate 13.

In the example of B of FIG. 8, the vibrator 21 is fixed to the LED substrate 13 by being attached at three locations with double-sided tape or the like. Fixing the vibrator 21 to the LED substrate 13 at the three locations makes it possible to facilitate transmission of the vibration of the vibrator 21 to the LED substrate 13.

Second Vibration Mechanism (Example in which Vibrator is Fixed Using Boss)

Figure 9:
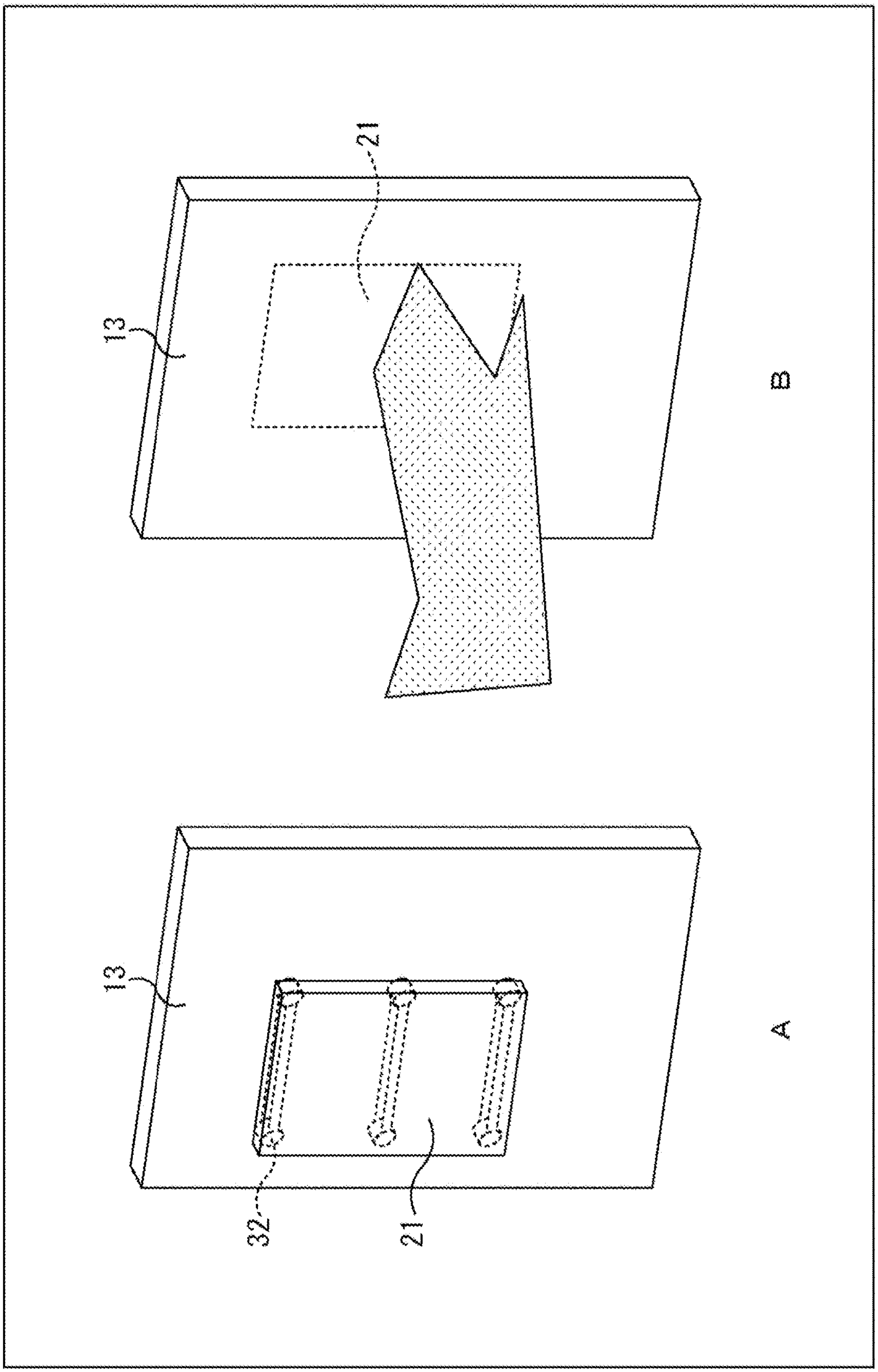
FIG. 9 depicts diagrams illustrating a second vibration mechanism.

FIG. 9 depicts diagrams illustrating a second vibration mechanism.

The second vibration mechanism is a mechanism configured to fix the vibrator 21 with use of bosses. As illustrated in A of FIG. 9, the vibrator 21 is fixed to the LED substrate 13 through multiple bosses 32. In the example of A of FIG. 9, the six bosses 32 with a cylindrical shape are mounted on the edge portion of the vibrator 21. A gap, which corresponds to the height of the boss 32, is formed between the vibrator 21 and the LED substrate 13.

The vibration generated by the vibrator 21 is transmitted to the LED substrate 13 through the boss 32. By the vibrator 21 vibrating the LED substrate 13 through the boss 32, as illustrated in B of FIG. 9, sound is output with the display surface of the LED substrate 13 serving as the radiating surface.

In a case where mounting parts such as driver ICs are provided on the back of the LED substrate 13, the vibrator 21 cannot be directly fixed to the back of the LED substrate 13. For example, the boss 32 is placed to avoid the mounting parts on the LED substrate 13. In the example of FIG. 9, mounting parts are provided in the gap formed between the vibrator 21 and the LED substrate 13.

In such a way, even in a case where mounting parts are provided on the back of the LED substrate 13, it is possible to output sound from the display unit 11 by the vibrator 21. As in the first vibration mechanism, since sound is output from the display unit 11 itself, the display apparatus 1 can provide a viewer with an experience as if sound were emitted from the person or object appearing in the image displayed on the display unit 11.

Third Vibration Mechanism (Example in which Chassis is Vibrated)

Figure 10:
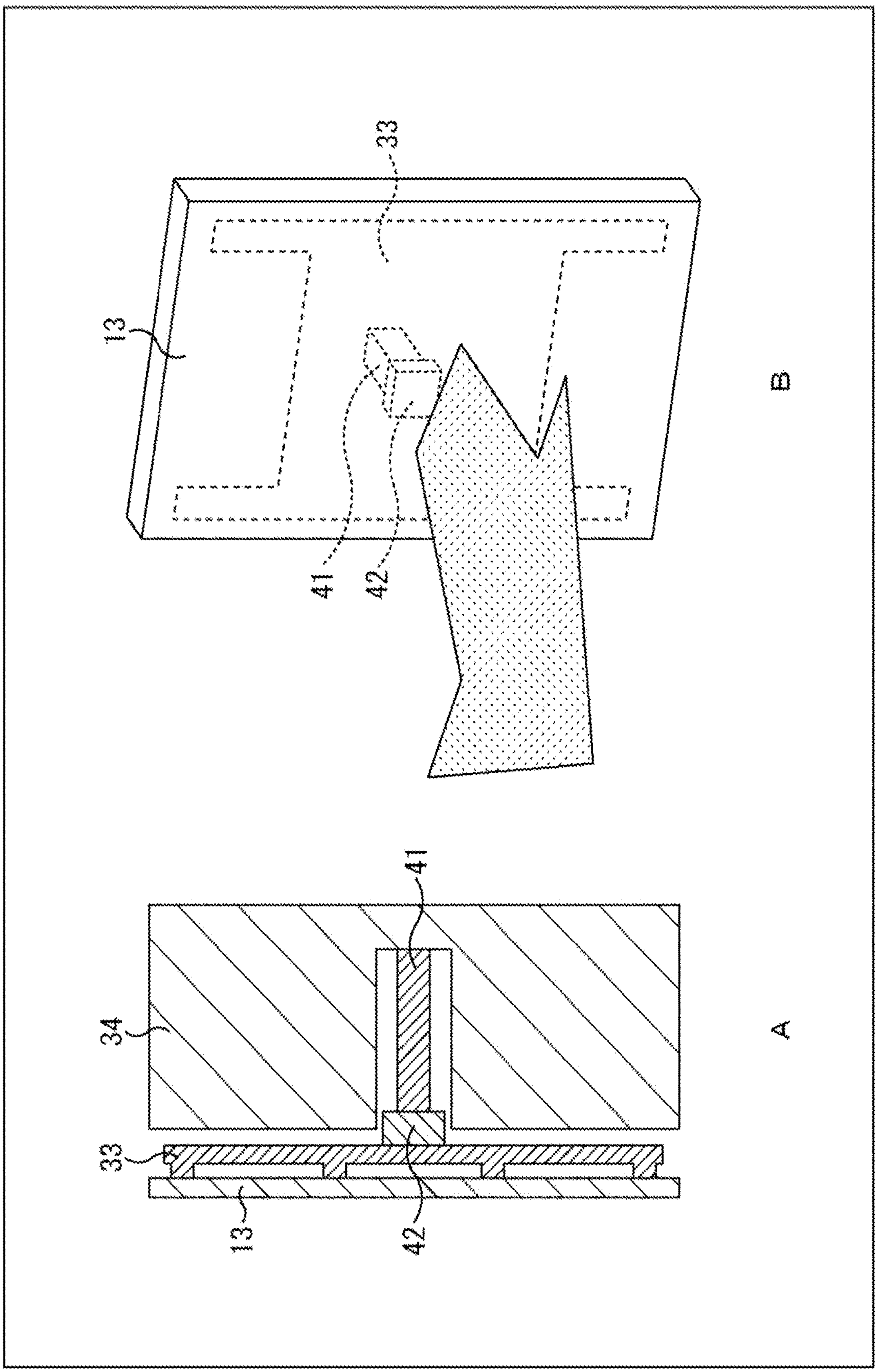
FIG. 10 depicts diagrams illustrating a third vibration mechanism.

FIG. 10 depicts diagrams illustrating a third vibration mechanism. In FIG. 10, A illustrates a cross section of the LED substrate 13, and B illustrates the front side of the LED substrate 13.

The third vibration mechanism is a mechanism configured to vibrate a chassis 33 provided on the back side of the LED substrate 13. The chassis 33, which includes metal such as iron, is provided with protruding fixing portions for fixing the LED substrate 13, as illustrated in A of FIG. 10. A gap, which corresponds to the height of the fixing portion, is formed between the chassis 33 and the LED substrate 13. Mounting parts such as driver ICs are placed in the gap between the chassis 33 and the LED substrate 13.

On the back side of the chassis 33, a module frame 34 is provided with a predetermined gap. The chassis 33 is mounted on a vibrator 41 embedded in the recess formed in the module frame 34, by the magnetic force of a magnet 42. Note that, the vibrator 41 may be directly fixed to the back side of the chassis 33.

The module frame 34 is a member configured to support the LED substrate 13, the vibrator 41, and the like. In the module frame 34, as many recesses in which the vibrators 41 are embedded as the LED substrates 13 provided in the display module 12 are formed, for example. On each of the vibrators 41, the LED substrate 13 is mounted as described above.

The vibrator 41 includes, for example, a stacked piezoelectric actuator formed in a quadrangular prism shape. When the vibrator 41 vibrates in response to a sound signal, the vibration is transmitted to the LED substrate 13. By the vibrator 41 vibrating the LED substrate 13 through the chassis 33, as illustrated in B of FIG. 10, sound is output with the display surface of the LED substrate 13 serving as the radiating surface.

Figure 11:
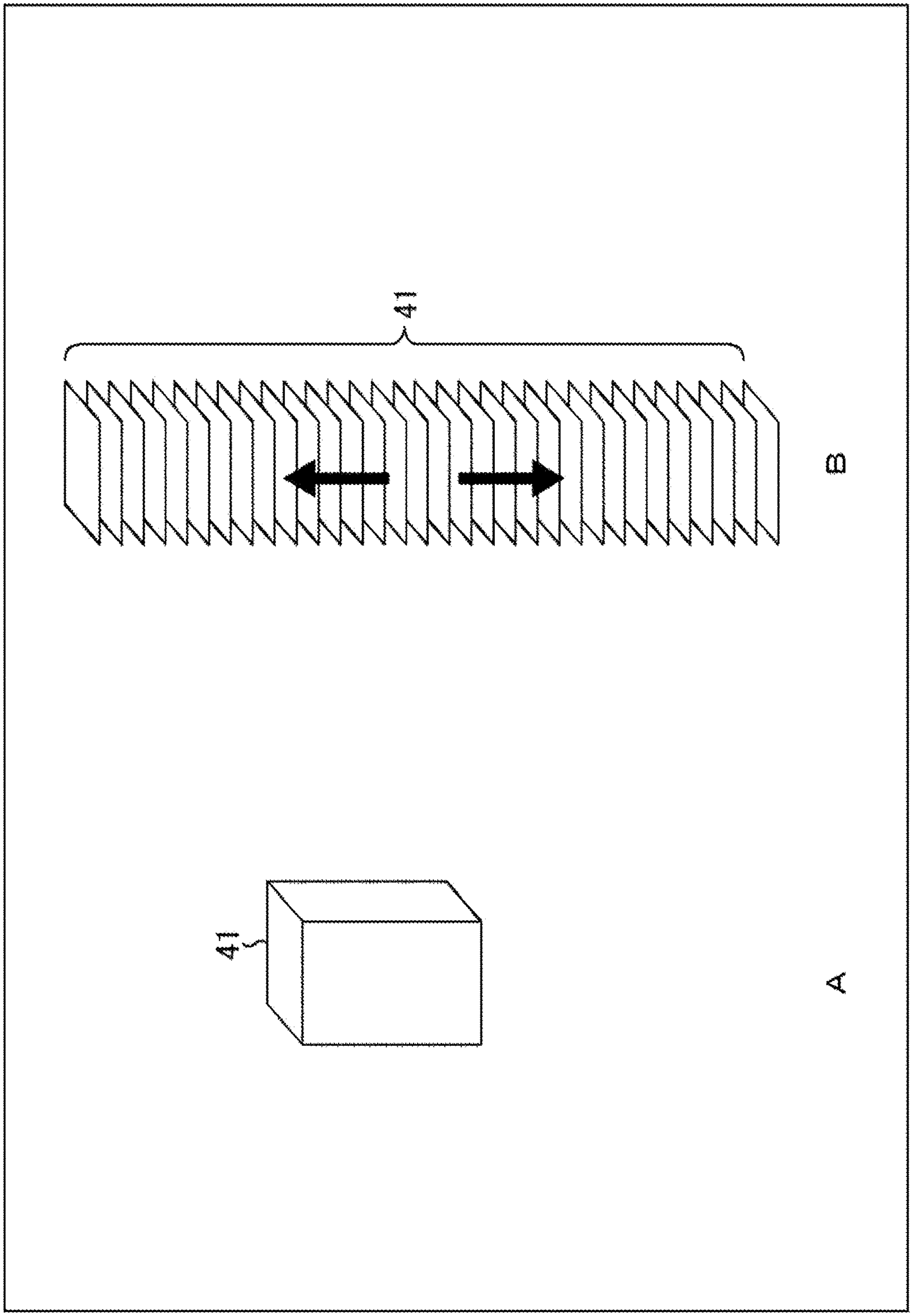
FIG. 11 depicts diagrams illustrating a configuration example of a vibrator.

FIG. 11 depicts diagrams illustrating a configuration example of the vibrator 41.

A quadrangular prism-shaped stacked piezoelectric actuator that serves as the vibrator 41 illustrated in A of FIG. 11 includes, for example, multiple ceramic layers stacked, as illustrated in B of FIG. 11 in a partially enlarged manner. When each ceramic layer elongates in the thickness direction, the entire stacked piezoelectric actuator elongates.

Note that, while the vibrator 21 (planar stacked piezoelectric actuator) of FIG. 6 vibrates in such a manner as to deform the LED substrate 13, the vibrator 41 (stacked piezoelectric actuator) of FIG. 10 vibrates the LED substrate 13 by elongating or contracting itself. Even in a case where it is difficult to deform the LED substrate 13 due to reinforcement of the LED substrate 13 by the chassis 33, it is possible to vibrate the LED substrate 13 by the vibrator 41.

In such a way, vibrating the LED substrate 13 through the chassis 33 makes it possible to output sound from the display unit 11.

Further, since the LED substrate 13 (chassis 33) is mounted on the module frame 34 by the magnet 42, the LED substrate 13 is demountable. This makes it possible to easily perform maintenance on the LED substrate 13 as compared to a case where the LED substrate 13 is fixed.

Fourth Vibration Mechanism (Example in which Display Module is Vibrated)

Figure 12:
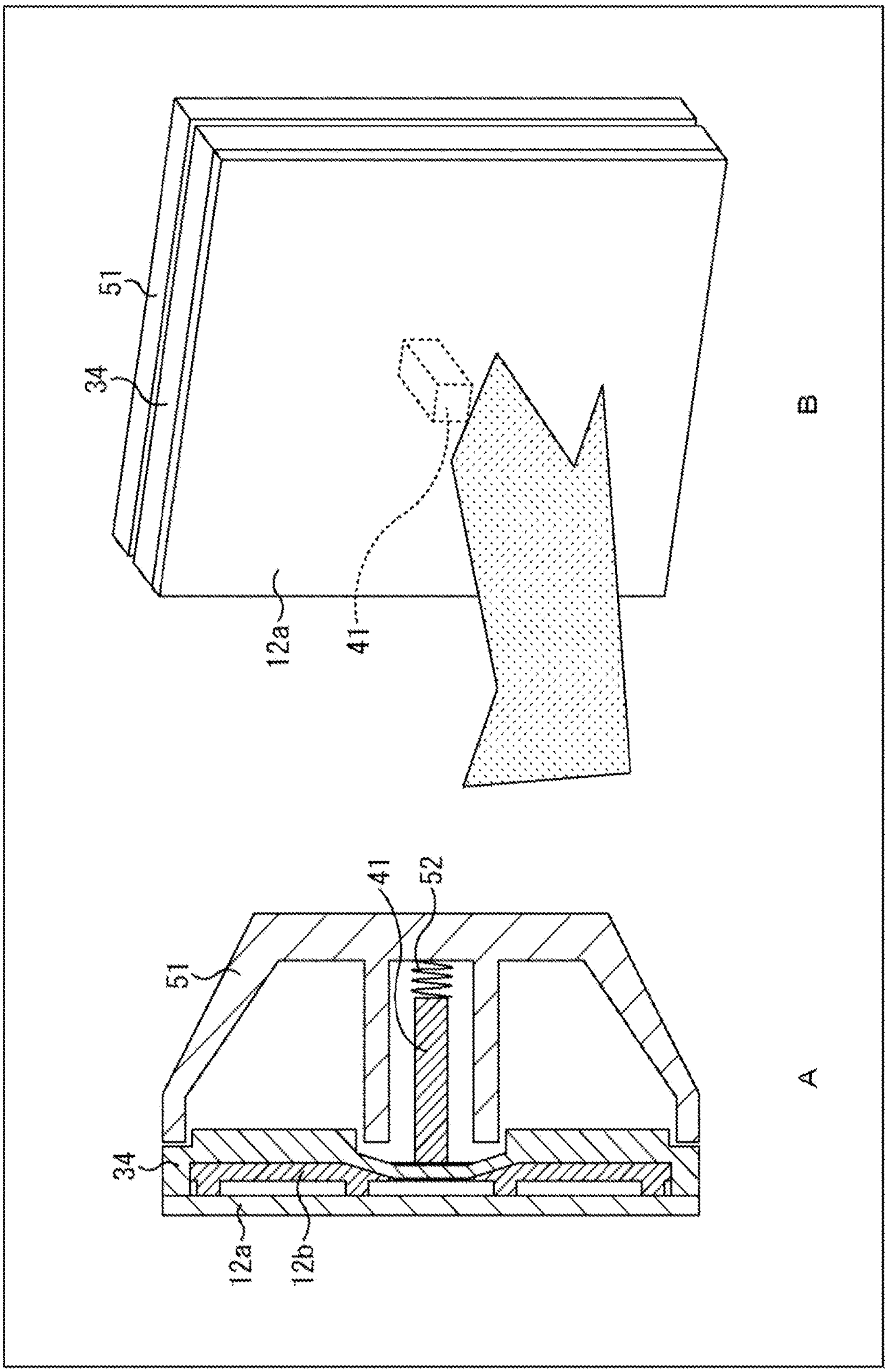
FIG. 12 depicts diagrams illustrating a fourth vibration mechanism.

FIG. 12 depicts diagrams illustrating a fourth vibration mechanism. In FIG. 12, A illustrates a cross section of the display module 12, and B illustrates the front side of the display module 12.

The fourth vibration mechanism is a mechanism configured to vibrate the entire display module 12. As illustrated in A of FIG. 12, the display module 12 includes the image display unit 12*a* fixed to the module frame 34 through a member 12*b*.

A back frame 51 is provided on the back side of the display module 12 to form a cabinet. Inside the cabinet, the vibrator 41 is provided at the center position on the back side of the module frame 34, for example. The vibrator 41 is mounted on the back frame 51 through a spring 52 fixed to the back frame 51. It is not necessary for the module frame 34 and the vibrator 41 to be fixed together. The vibrator 41 can be pressed against the module frame 34 by the spring 52.

Since the module frame 34 and the vibrator 41 are not fixed together, the display module 12 is demountable. This makes it possible to easily perform maintenance on the display module 12. Note that, the vibrator 41 may be directly fixed to the back side of the module frame 34.

When the vibrator 41 vibrates in response to a sound signal, the vibration is transmitted to the entire display module 12. By the vibrator 41 vibrating the entire display module 12, as illustrated in B of FIG. 12, sound is output with the image display unit 12*a* of the display module 12 serving as the radiating surface.

In such a way, vibrating the entire display module 12, instead of vibrating the LED substrate 13 of the display module 12, makes it possible to output sound from the display unit 11.

Further, even in a case where it is difficult to provide a vibrator for each LED substrate, it is possible to achieve the output of sound from the display unit 11.

Fifth Vibration Mechanism (Example in which Multiple Vibrators are Used)

Figure 13:
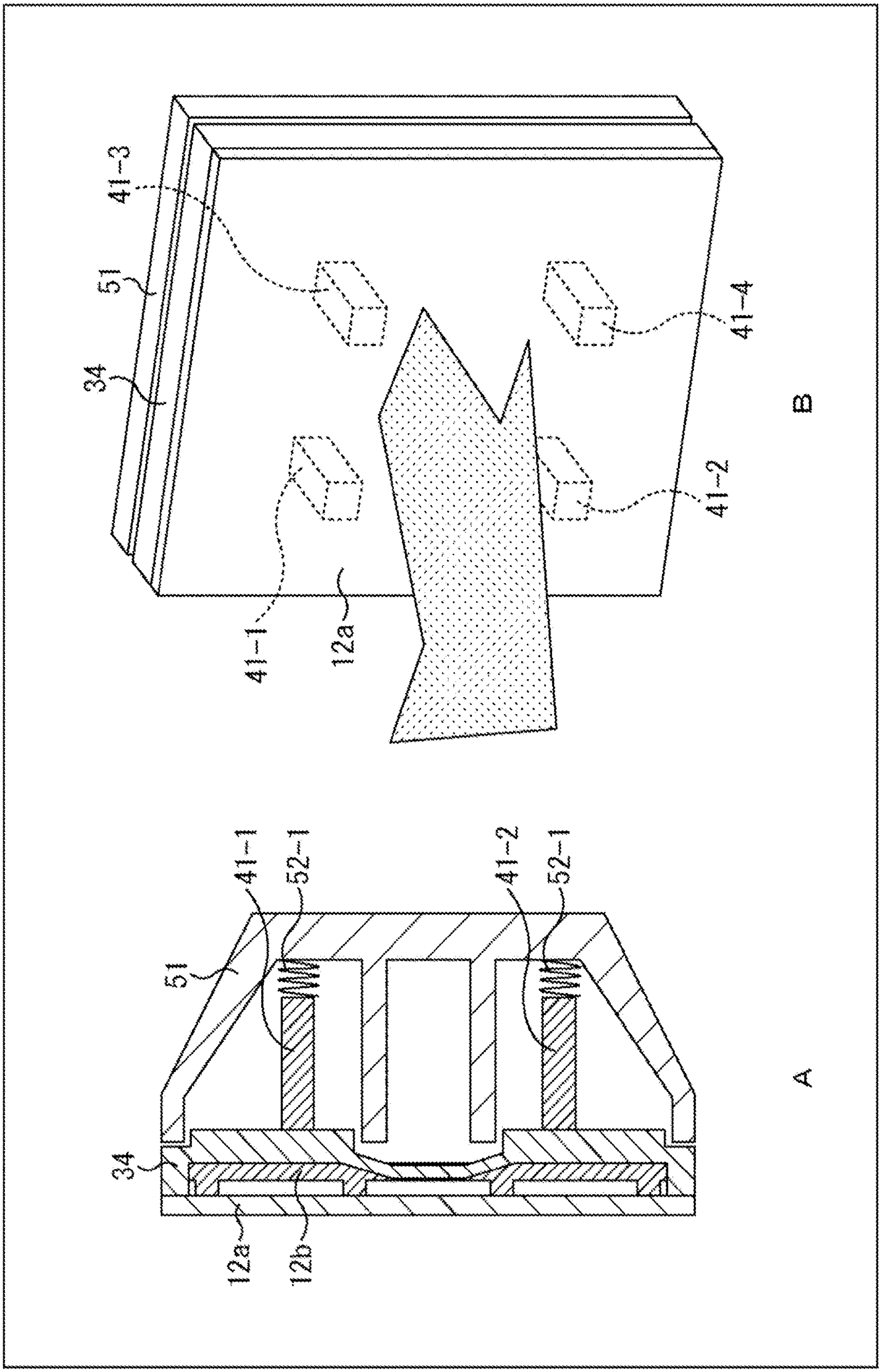
FIG. 13 depicts diagrams illustrating a fifth vibration mechanism.

FIG. 13 depicts diagrams illustrating a fifth vibration mechanism.

The fifth vibration mechanism is a mechanism configured to vibrate the display module 12 with use of multiple vibrators 41. As illustrated in A of FIG. 13 in which the display module 12 is vibrated at four locations, for example, inside the cabinet, a vibrator 41-1 is provided at the upper position on the back side of the module frame 34, and a vibrator 41-2 is provided at the lower position. The vibrator 41-1 is mounted on a spring 52-1 fixed to the back frame 51, and the vibrator 41-2 is mounted on a spring 52-2 fixed to the back frame 51.

As in the configuration described with reference to FIG. 12, it is not necessary for the module frame 34 and the vibrators 41-1 and 41-2 to be fixed together. The vibrators 41-1 and 41-2 can be pressed against the module frame 34 by the springs 52-1 and 52-2.

As illustrated in B of FIG. 13, vibrators 41-3 and 41-4 having configurations similar to those of the vibrators 41-1 and 41-2 are provided inside the cabinet.

When the vibrators 41-1 to 41-4, which are provided at regular intervals, vibrate in response to a sound signal, the vibration is uniformly transmitted to the entire display module 12. By the vibrators 41-1 to 41-4 vibrating the entire display module 12, as illustrated in B of FIG. 13, sound is output with the image display unit 12*a* of the display module 12 serving as the radiating surface.

In such a way, uniformly vibrating the entire display module 12 by the multiple vibrators makes it possible to output sound from the display unit 11 while maintaining the parallelism of the display module 12.

Further, even in a case where it is difficult to change the specifications of the LED substrate, it is possible to achieve the output of sound from the display unit 11, as in the fourth vibration mechanism.

Sixth Vibration Mechanism (Example in which Vibrator is Inserted from Outside of Cabinet)

Figure 14:
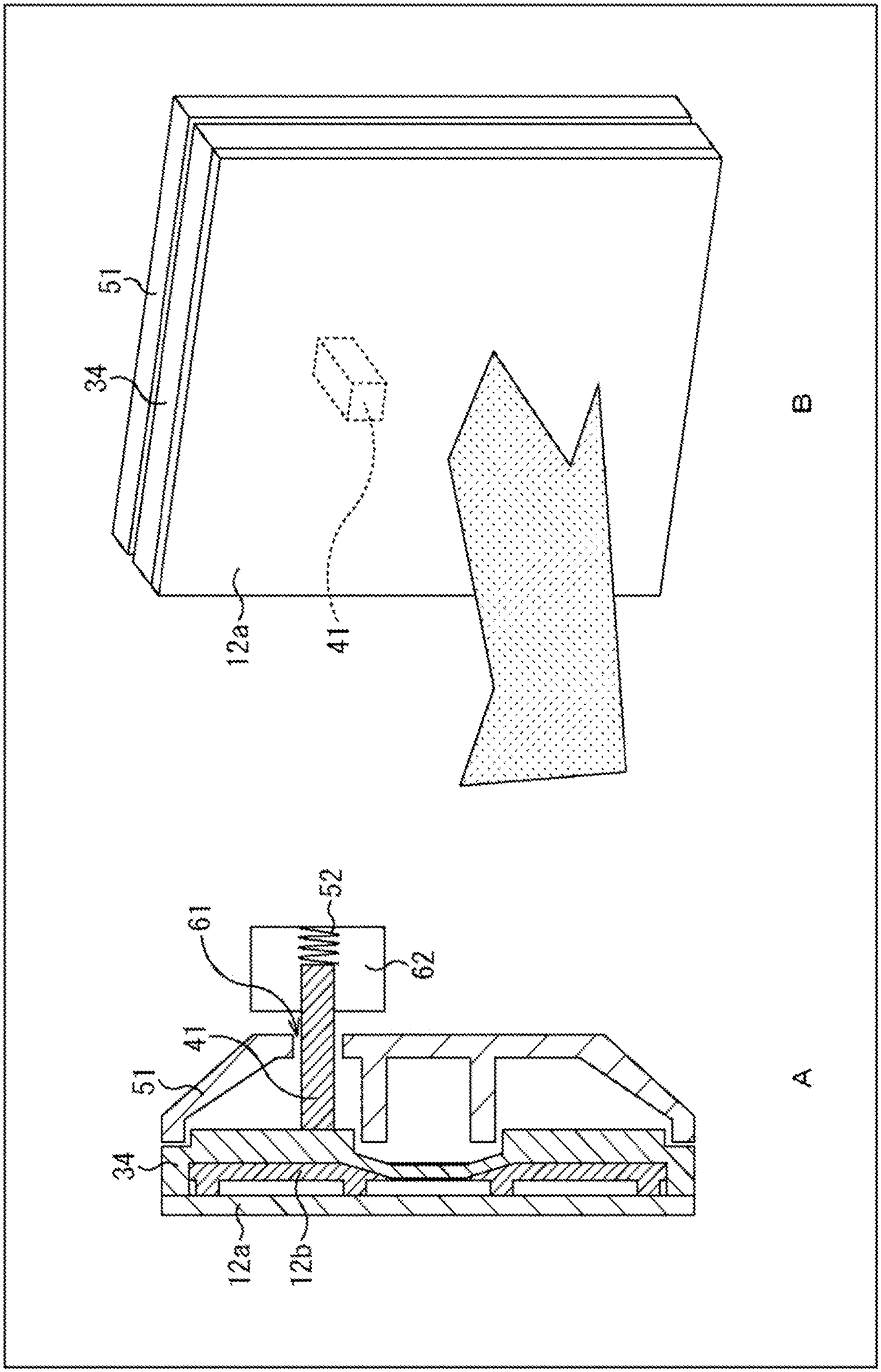
FIG. 14 depicts diagrams illustrating a sixth vibration mechanism.

FIG. 14 depicts diagrams illustrating a sixth vibration mechanism.

The sixth vibration mechanism is a mechanism configured to vibrate the entire display module 12 by the vibrator 41 inserted from the outside of the cabinet. As illustrated in A of FIG. 14, an opening 61 facing the back side of the cabinet is formed in a part of the back frame 51. The vibrator 41 inserted from the outside of the cabinet through the opening 61 is provided to be pressed against the upper position on the back side of the module frame 34 by the spring 52.

The vibrator 41 is mounted on the spring 52 fixed inside an external vibration box 62. When the vibrator 41 vibrates in response to a sound signal, the vibration is transmitted to the entire display module 12. By the vibrator 41 vibrating the entire display module 12, as illustrated in B of FIG. 14, sound is output with the image display unit 12*a* of the display module 12 serving as the radiating surface.

In such a way, vibrating the entire display module 12 by the vibrator 41 provided to the external vibration box 62 makes it possible to output sound from the display unit 11.

In a case where the display unit 11 includes a cabinet from which sound is output and a cabinet from which no sound is output, a management cost for managing each cabinet is required. Further, when designing a new model of the display apparatus 1, the process of designing a mechanism configured to vibrate the display unit 11, which is compatible with the new model, is required.

In the sixth vibration mechanism, forming the opening 61 in the back frame 51 of the cabinet and mounting the external vibration box 62 (external unit) as a retrofit make it possible to achieve the output of sound from the display unit 11.

Among the multiple cabinets with the openings 61 formed at the common position, the external vibration box 62 is mounted on the cabinet from which sound is output, but not on the cabinet from which no sound is output. This makes it possible to achieve the display unit 11 configured to output, using common design cabinets, sound only from predetermined cabinets.

Since there is no need to make any design changes to the cabinets other than forming the opening 61, the sixth vibration mechanism can be applied to various models of the display apparatus 1, and can be said to be a highly versatile mechanism.

Seventh Vibration Mechanism (Example in which Equipment is Incorporated in External Vibration Box)

Figure 15:
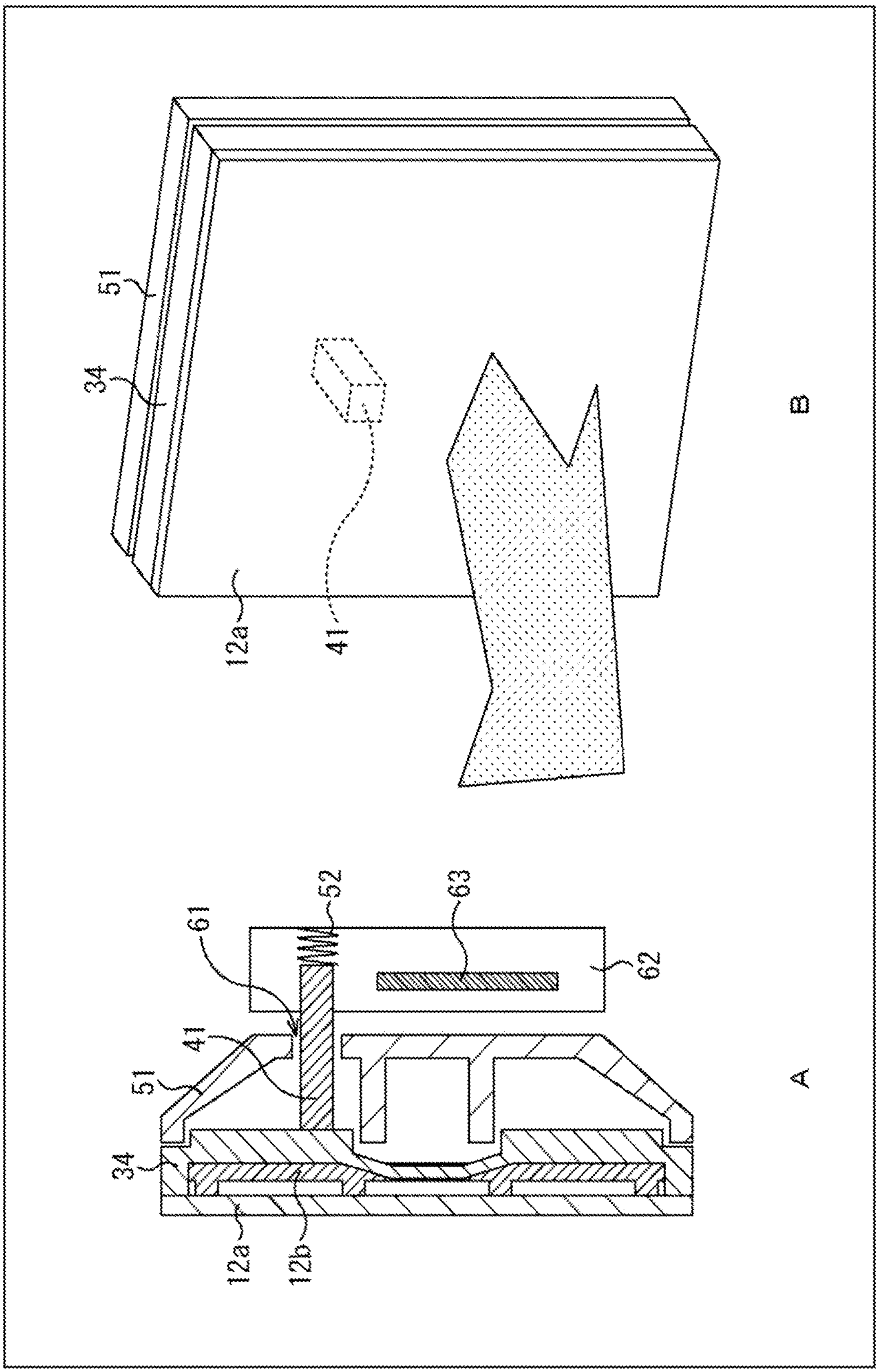
FIG. 15 depicts diagrams illustrating a seventh vibration mechanism.

FIG. 15 depicts diagrams illustrating a seventh vibration mechanism.

The seventh vibration mechanism is a mechanism in which equipment 63 is provided inside the external vibration box 62. As illustrated in A of FIG. 15, inside the external vibration box 62 larger than the external vibration box 62 of FIG. 14, the equipment 63 configured to correct the acoustic characteristics of the vibrator 41 is provided. The equipment 63 includes a DSP (Digital Signal Processor), an amplifier, or the like connected to the vibrator 41. The equipment 63 applies signal processing optimized for the vibrator 41 to sound signals.

When the vibrator 41 vibrates in response to the sound signal that has undergone signal processing by the equipment 63, the vibration is transmitted to the entire display module 12. By the vibrator 41 vibrating the entire display module 12, as illustrated in B of FIG. 15, sound is output with the image display unit 12*a* of the display module 12 serving as the radiating surface.

In the seventh vibration mechanism, performing signal processing by the equipment 63 incorporated in the external vibration box 62 makes it possible to enhance the sound quality.

Further, in the seventh vibration mechanism, since the amplifier is incorporated in the external vibration box 62, there is no need to prepare a separate amplifier. For example, in the sixth vibration mechanism (FIG. 14), it is necessary to prepare a separate amplifier for enhancing the sound quality.

Performing signal processing using the amplifier for the vibrator 41 incorporated in the external vibration box 62 makes it possible to enhance the sound quality.

Eighth Vibration Mechanism (Example in which Multiple Vibrators are Inserted from Outside of Cabinet)

Figure 16:
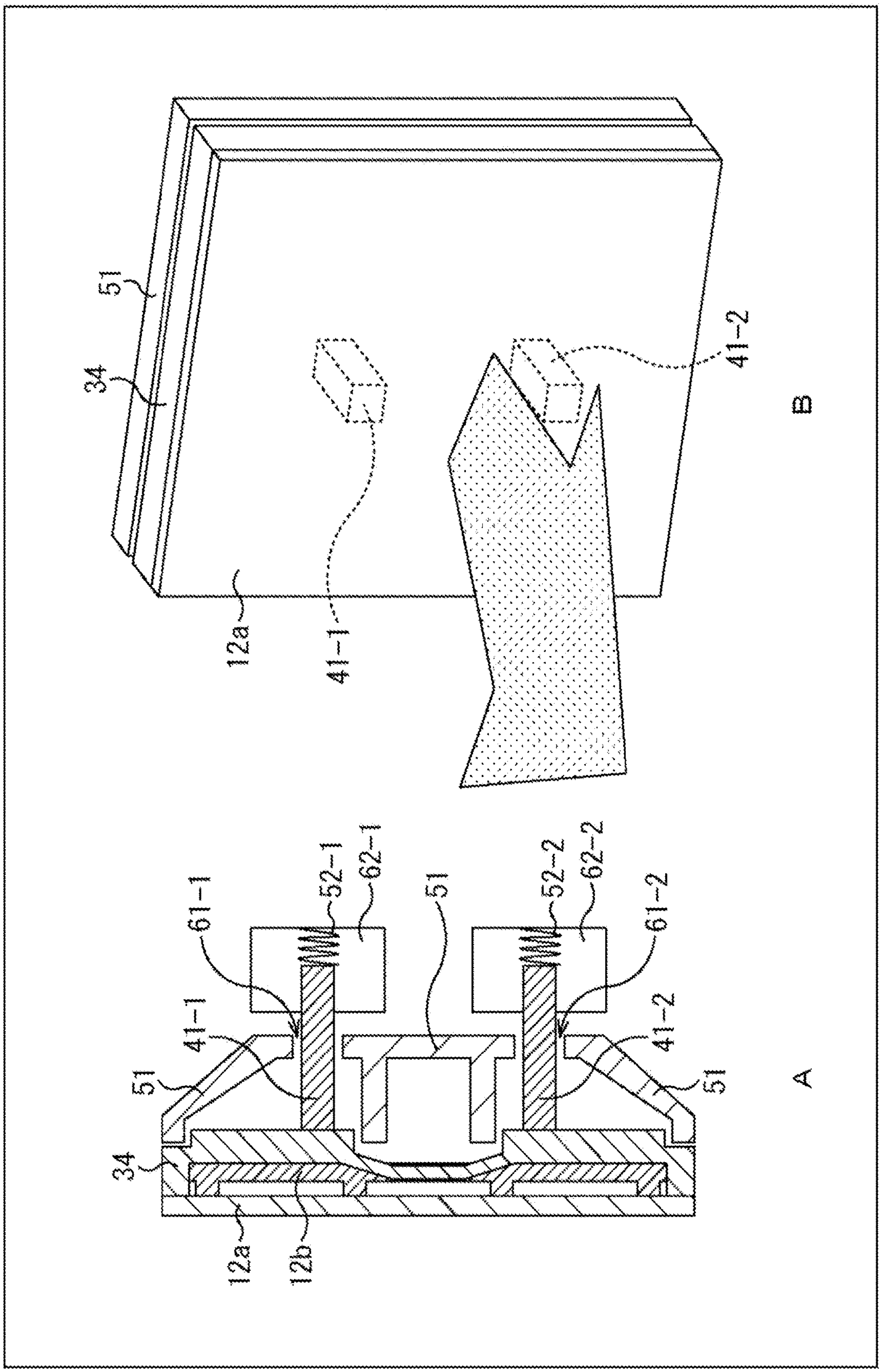
FIG. 16 depicts diagrams illustrating an eighth vibration mechanism.

FIG. 16 depicts diagrams illustrating an eighth vibration mechanism.

The eighth vibration mechanism is a mechanism configured to vibrate the entire display module 12 by the multiple vibrators 41 inserted from the outside of the cabinet. As illustrated in A of FIG. 16, an opening 61-1 facing the back side of the cabinet is formed at the upper position of the back frame 51, and an opening 61-2 facing the back side of the cabinet is formed at the lower position.

The vibrator 41-1 inserted from the outside of the cabinet through the opening 61-1 is provided to be pressed against the upper position on the back side of the module frame 34 by the spring 52. Further, the vibrator 41-2 inserted from the outside of the cabinet through the opening 61-2 is provided to be pressed against the lower position on the back side of the module frame 34.

The vibrator 41-1 is mounted on the spring 52-1 fixed inside an external vibration box 62-1, and the vibrator 41-2 is mounted on the spring 52-2 fixed inside an external vibration box 62-2.

When the vibrators 41-1 and 41-2 vibrate in response to a sound signal, the vibration is transmitted to the entire display module 12. By the vibrators 41-1 and 41-2 vibrating the entire display module 12, as illustrated in B of FIG. 16, sound is output with the image display unit 12*a* of the display module 12 serving as the radiating surface.

In the eighth vibration mechanism, since the display module 12 is vibrated by the multiple vibrators 41-1 and 41-2, it is possible to enhance the sound pressure as compared to the sixth vibration mechanism configured to vibrate the entire display module 12 by the single vibrator 41. The number of vibrators provided in the single display module 12 can appropriately be changed depending on the required sound pressure.

Balancing the vibration of the vibrator 41-1 and the vibrator 41-2 makes it possible to make the sound have a uniform directivity.

Further, it is possible to make the sound emitted from the respective adjacent display modules 12 have directivity patterns with natural interference. This makes it possible to enhance the sound quality.

Ninth Vibration Mechanism (Example in which Equipment Connected to Multiple Vibrators is Incorporated in External Vibration Box)

Figure 17:
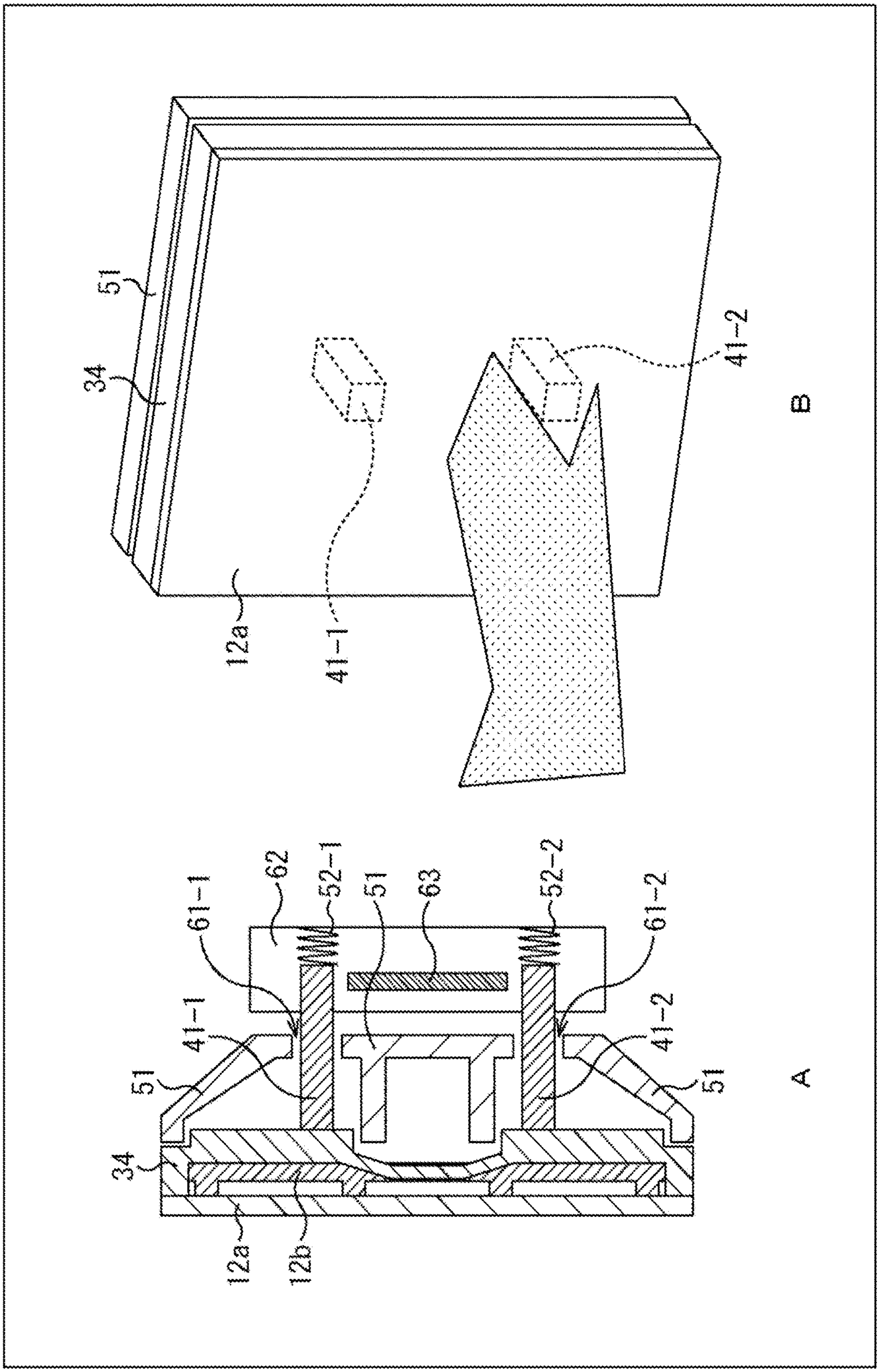
FIG. 17 depicts diagrams illustrating a ninth vibration mechanism.

FIG. 17 depicts diagram illustrating a ninth vibration mechanism.

The ninth vibration mechanism is a mechanism in which equipment connected to multiple vibrators is provided inside the external vibration box 62. As illustrated in A of FIG. 17, the vibrators 41-1 and 41-2 are mounted on the springs 52-1 and 52-2 fixed inside the external vibration box 62 larger than the external vibration box 62 of FIG. 14. Inside the external vibration box 62, the equipment 63 configured to correct the acoustic characteristics of the vibrator 41-1 and the vibrator 41-2 is provided between the vibrator 41-1 and the vibrator 41-2.

Signal processing optimized for the vibrator 41-1 and the vibrator 41-2 is performed by the equipment 63. Performing signal processing by the equipment 63 makes it possible to control the vibrator 41-1 and the vibrator 41-2 in a coordinated manner.

In a case where the display module 12 is vibrated by multiple vibrators, more complex control is required as compared to a case where the display module 12 is vibrated by a single vibrator. Controlling the vibrators in a coordinated manner makes it possible to output high-quality sound, which cannot be achieved by a separately provided amplifier, from the display module 12.

In the ninth vibration mechanism, since the amplifier is incorporated in the external vibration box 62, there is no need to prepare a separate amplifier. For example, in the eighth vibration mechanism (FIG. 16), it is necessary to prepare a separate amplifier for enhancing the sound quality.

Performing signal processing using the amplifier for the vibrators 41-1 and 41-2 incorporated in the external vibration box 62 makes it possible to enhance the sound quality.

2. CONFIGURATION OF DISPLAY APPARATUS

Figure 18:
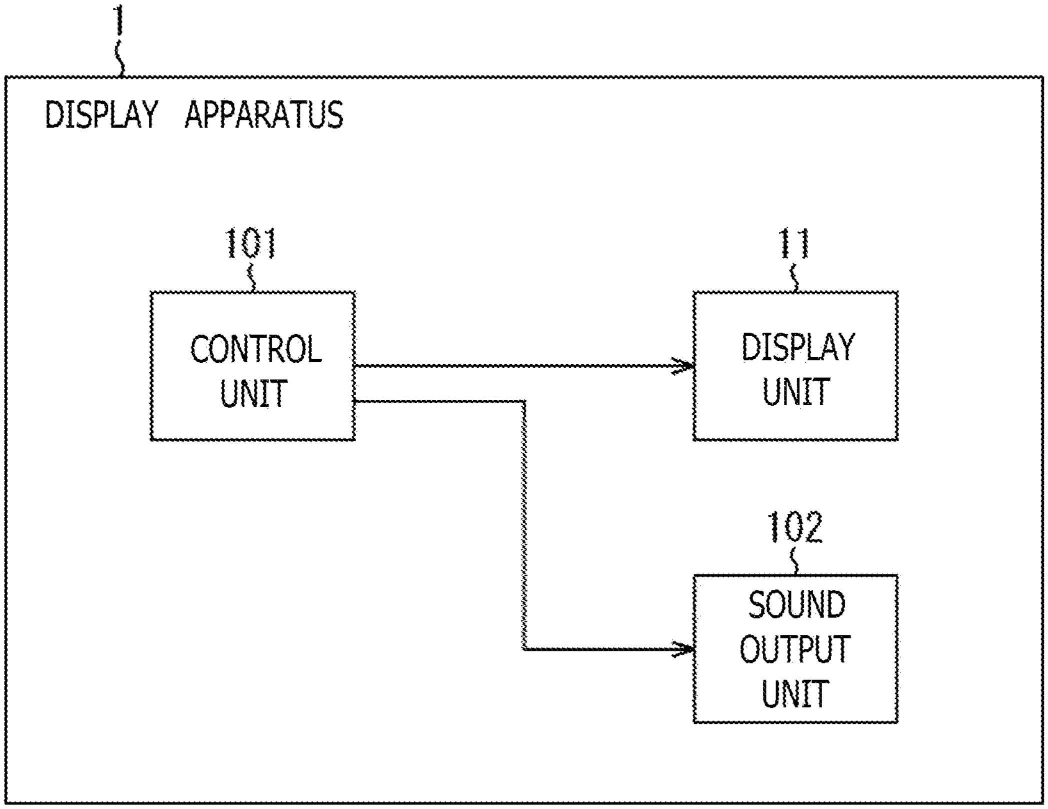
FIG. 18 is a block diagram illustrating a functional configuration example of the display apparatus.

FIG. 18 is a block diagram illustrating a functional configuration example of the display apparatus 1.

As illustrated in FIG. 18, the display apparatus 1 includes a control unit 101, the display unit 11, and a sound output unit 102.

The control unit 101 includes a processor such as a CPU (Central Processing Unit) or a GPU (Graphics Processing Unit), a memory such as a ROM (Read Only Memory) or a RAM (Random Access Memory), a storage device such as a hard disk, and the like. For example, various operations of the display apparatus 1, such as displaying images, are controlled by the CPU loading a program stored in advance in the ROM into the RAM and executing the program.

The control unit 101 controls the display unit 11 to display the image obtained by reproduction of content and controls the sound output unit 102 to output the sound. The display of images and the output of sound may be controlled through, not only integrated control therefor, but separate processing processes therefor.

The sound output unit 102 includes the LED substrate 13 provided with the vibrator 21, the display module 12 provided with the vibrator 41, or the like. The sound output unit 102 outputs sound under the control of the control unit 101. The sound output unit 102 may be provided as an external apparatus to the display apparatus 1.

Figure 19:
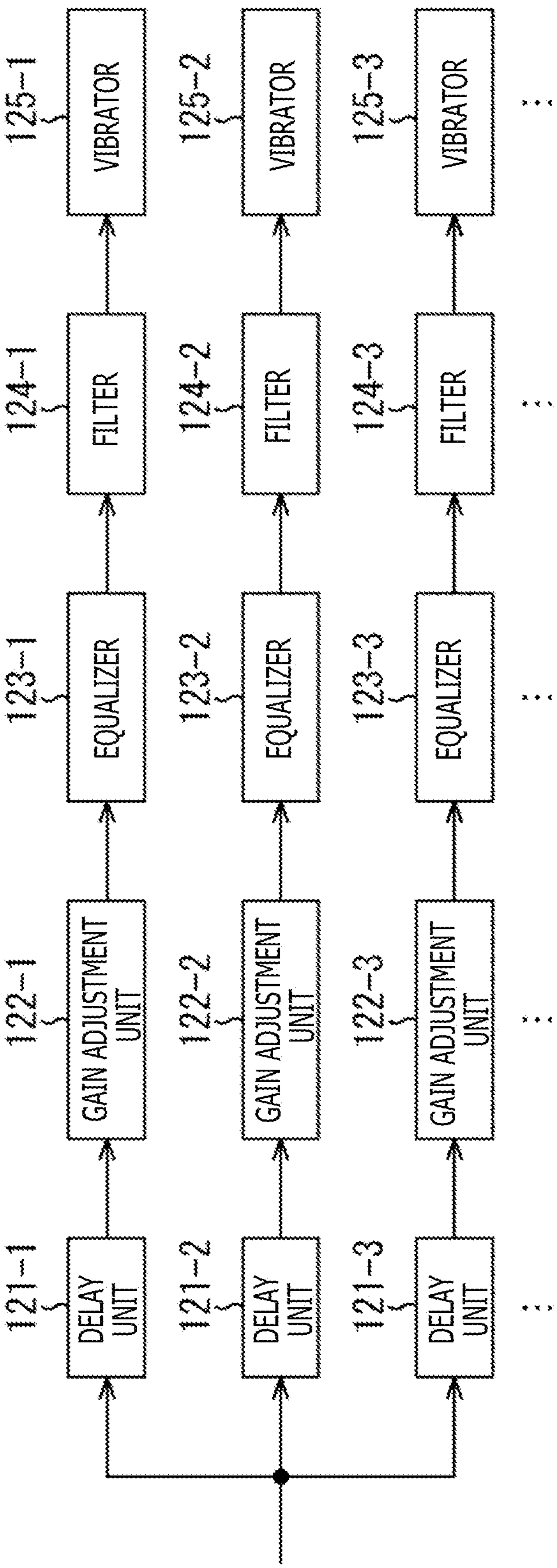
FIG. 19 is a block diagram illustrating a detailed configuration example of a sound output unit.

FIG. 19 is a block diagram illustrating a detailed configuration example of the sound output unit 102.

As illustrated in FIG. 19, the sound output unit 102 includes as many signal processing systems as vibrators, each signal processing system including a delay unit, a gain adjustment unit, an equalizer, and a filter. In the example of FIG. 19, the sound output unit 102 includes delay units 121-1 to 121-3, gain adjustment units 122-1 to 122-3, equalizers 123-1 to 123-3, filters 124-1 to 124-3, and vibrators 125-1 to 125-3.

The delay units 121-1 to 121-3 are supplied with a sound signal. After delaying the supplied sound signals by predetermined period of times, the delay units 121-1 to 121-3 output the sound signals to the gain adjustment units 122-1 to 122-3.

For example, the delay time of the delay unit 121-1, the delay time of the delay unit 121-2, and the delay time of the delay unit 121-3 are independently controlled to be appropriate delay times. Delay processing in the delay units 121-1 to 121-3 is performed to allow the vibrators 125-1 to 125-3 to output sound at the same timing, for example. Besides, delay processing is performed also to control interference between the vibrators 125-1 to 125-3, and to control the directivity of sound to be radiated.

Note that, in a case where there is no need to distinguish between the delay units 121-1 to 121-3, the delay units 121-1 to 121-3 are collectively referred to as a "delay unit 121." The other configurations provided in multiple units are also collectively referred to in the description.

The gain adjustment units 122-1 to 122-3 adjust the gains of the sound signals supplied from the delay units 121-1 to 121-3 and output the gain-adjusted sound signals to the equalizers 123-1 to 123-3.

For example, in the gain adjustment units 122-1 to 122-3, the gains of sound signals are adjusted to make the sound pressures of the sound output from the display unit 11 by the vibration generated by the vibrators 125-1 to 125-3 be desired sound pressures such as the same sound pressure.

The equalizers 123-1 to 123-3 apply equalization processing to the sound signals supplied from the gain adjustment units 122-1 to 122-3 and output the thus obtained sound signals to the filters 124-1 to 124-3.

For example, in the equalizers 123-1 to 123-3, equalization processing is performed on sound signals to make the sound output from the display unit 11 by the vibration generated by the vibrators 125-1 to 125-3 have desired characteristics such as flat characteristics.

The filters 124-1 to 124-3 perform filtering on the sound signals supplied from the equalizers 123-1 to 123-3, to allow predetermined components to pass, and output the thus obtained sound signals to the vibrators 125-1 to 125-3.

The vibrators 125-1 to 125-3 correspond to the vibrator 21 (for example, FIG. 4) provided on the LED substrate 13 or the vibrator 41 (for example, FIG. 12) provided in the display module 12. The vibrators 125-1 to 125-3 vibrate in response to the sound signals supplied from the filters 124-1 to 124-3, to vibrate the LED substrate 13 or the display module 12, thereby allowing the display unit 11 to output sound.

3. MODIFIED EXAMPLE

First Modified Example (Example in which Low-Frequency Speaker is Provided)

Figure 20:
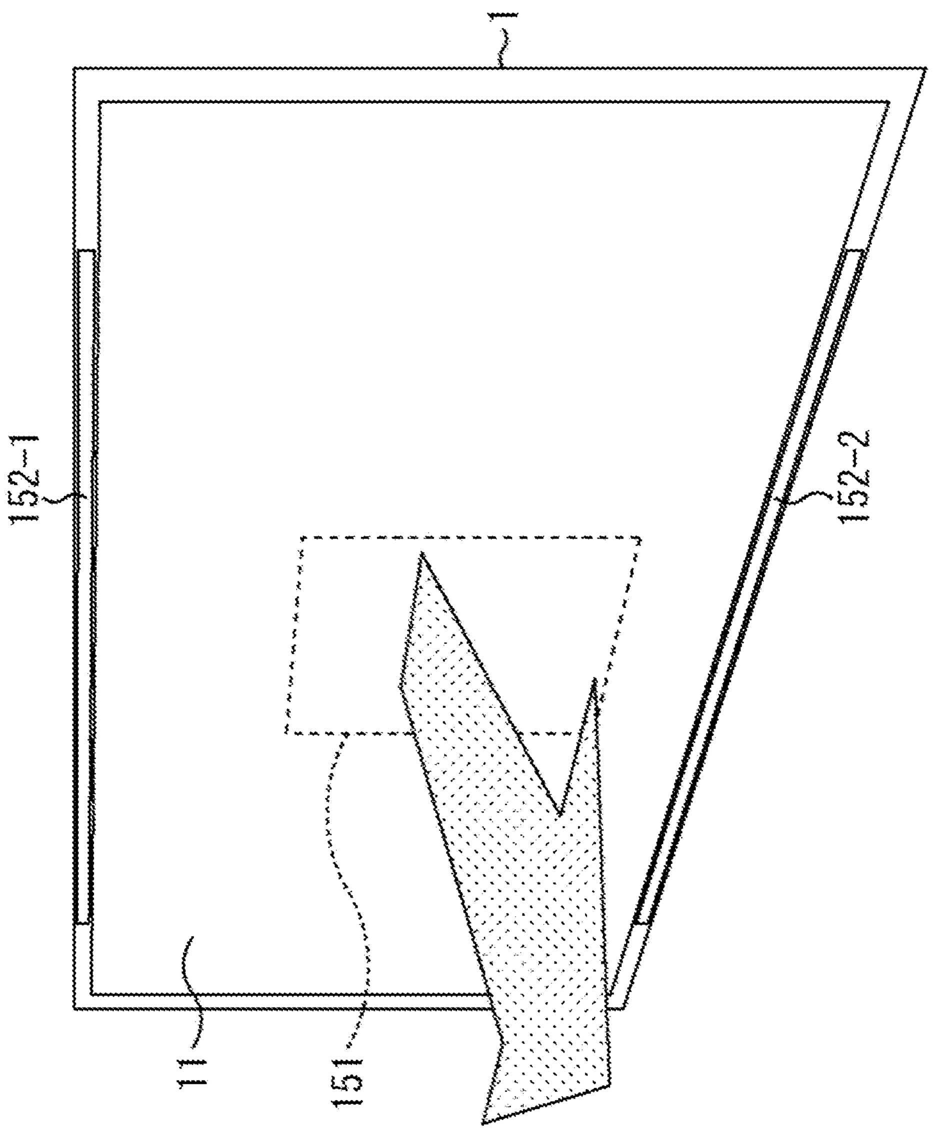
FIG. 20 is a view illustrating a first modified example of the display apparatus.

FIG. 20 is a view illustrating a first modified example of the display apparatus 1. The same components as the components described above are denoted by the same reference signs. Repetitive descriptions are omitted as appropriate.

The display apparatus 1 illustrated in FIG. 20 includes the display unit 11, a screen vibration sound output unit 151, and low-frequency speakers 152 (152-1 and 152-2).

The screen vibration sound output unit 151 includes a configuration using any of the above-mentioned first to ninth vibration mechanisms being provided at the center of the display unit 11. The configuration using any of the first to ninth vibration mechanisms functions as the screen vibration sound output unit 151 configured to allow the display unit 11 to output sound.

The low-frequency speaker 152 includes, for example, an array speaker. A speaker other than an array speaker may be provided as the low-frequency speaker 152. The low-frequency speaker 152-1 is provided in the upper frame portion to be adjacent to the display unit 11, and the low-frequency speaker 152-2 is provided in the lower frame portion to be adjacent to the display unit 11. Note that, it is also possible to provide only one of the low-frequency speaker 152-1 and the low-frequency speaker 152-2. Providing the two low-frequency speakers 152-1 and 152-2 in the upper and lower portions of the display unit 11 makes it possible to create a sense of integration.

In the example of FIG. 20, sound is output from the screen vibration sound output unit 151 and the low-frequency speaker 152. It is sometimes difficult for the screen vibration sound output unit 151 to output low-frequency sound, resulting in deterioration in sound quality. For example, high-frequency sound is output from the screen vibration sound output unit 151, and low-frequency sound is output from the low-frequency speaker 152.

Figure 21:
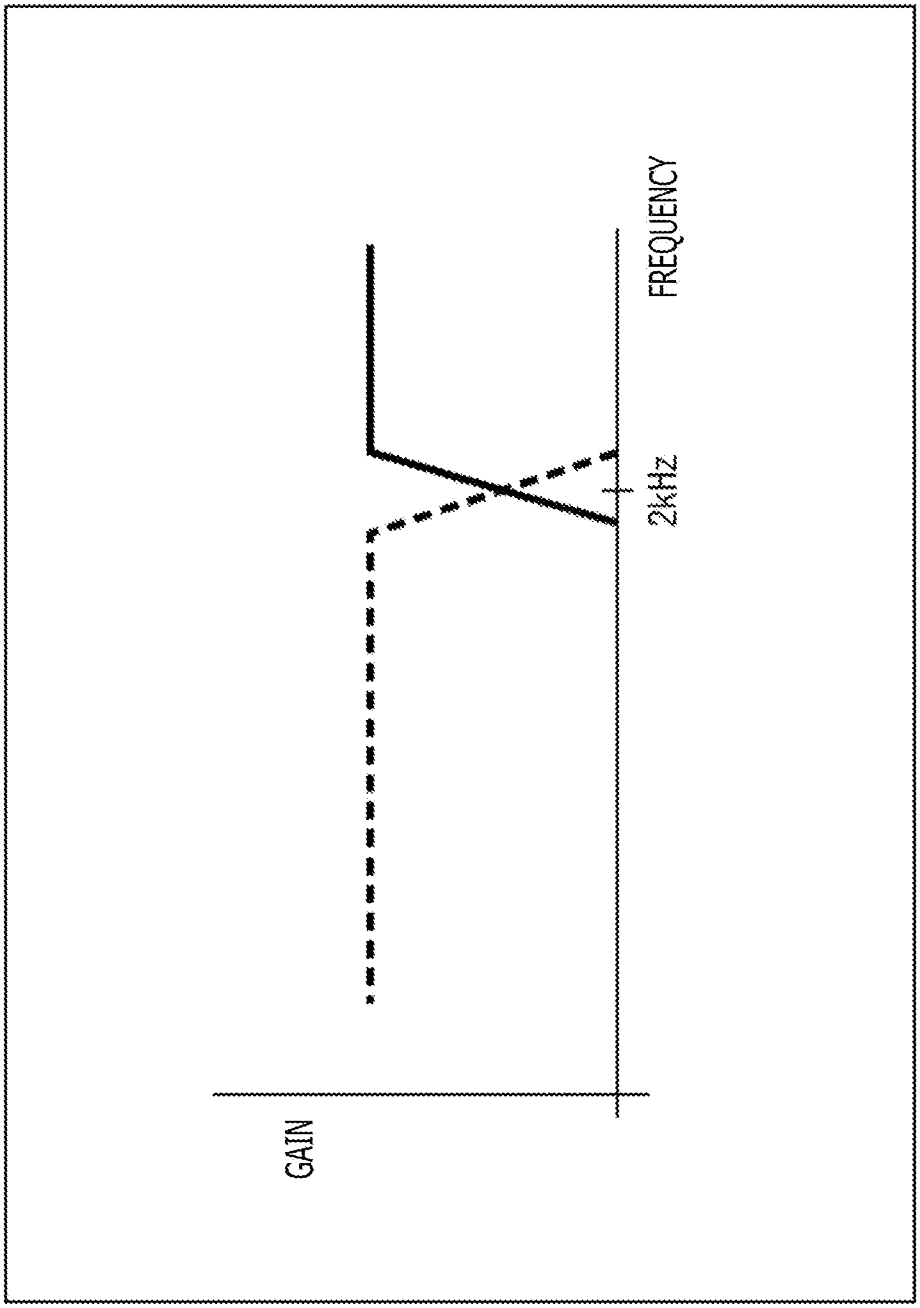
FIG. 21 is a diagram illustrating exemplary frequency characteristics of the sound output from a screen vibration sound output unit and a low-frequency speaker.

FIG. 21 is a diagram illustrating exemplary frequency characteristics of the sound output from the screen vibration sound output unit 151 and the low-frequency speaker 152. In FIG. 21, the horizontal axis represents frequency, and the vertical axis represents gain.

For example, as indicated by the dashed line in FIG. 21, sound with frequencies equal to or less than 2 kHz is output from the low-frequency speaker 152 as low-frequency sound. Further, as indicated by the solid line in FIG. 21, sound with frequencies equal to or more than 2 kHz is output from the screen vibration sound output unit 151 as high-frequency sound.

By high-frequency sound being output from the screen vibration sound output unit 151 provided within the display unit 11, a viewer perceives the sound image of the sound as being localized to a position on the display unit 11. Localizing a sound image with a clear sense of localization, that is, the sound image of high-pitched sound (high-frequency sound) effective for localization, within the display unit 11 makes it is possible to create a sense of integration between images and sound.

On the other hand, as compared to the sound image of high-frequency sound, the sound image of low-frequency sound has unclear localization (lower sense of localization). Outputting low-frequency sound from the low-frequency speaker 152 makes it possible to ensure sufficient sound pressure for low-frequency sound and prevent deterioration in sound quality.

That is, outputting high-frequency sound from the screen vibration sound output unit 151 and outputting low-frequency sound from the low-frequency speaker 152 make it possible to achieve the output of high-quality sound in the full range from low to high frequencies.

For example, in the display apparatus 1, by directivity control being performed, the sound propagated at approximately the same spreading degree as the sound output from the screen vibration sound output unit 151 is output from the low-frequency speaker 152. Propagating high-frequency sound and low-frequency sound at approximately the same spreading degree makes it possible to match the directions from which a viewer perceives high-frequency sound and low-frequency sound and prevent the generation of interference fringes to enhance the sound quality.

Figure 22:
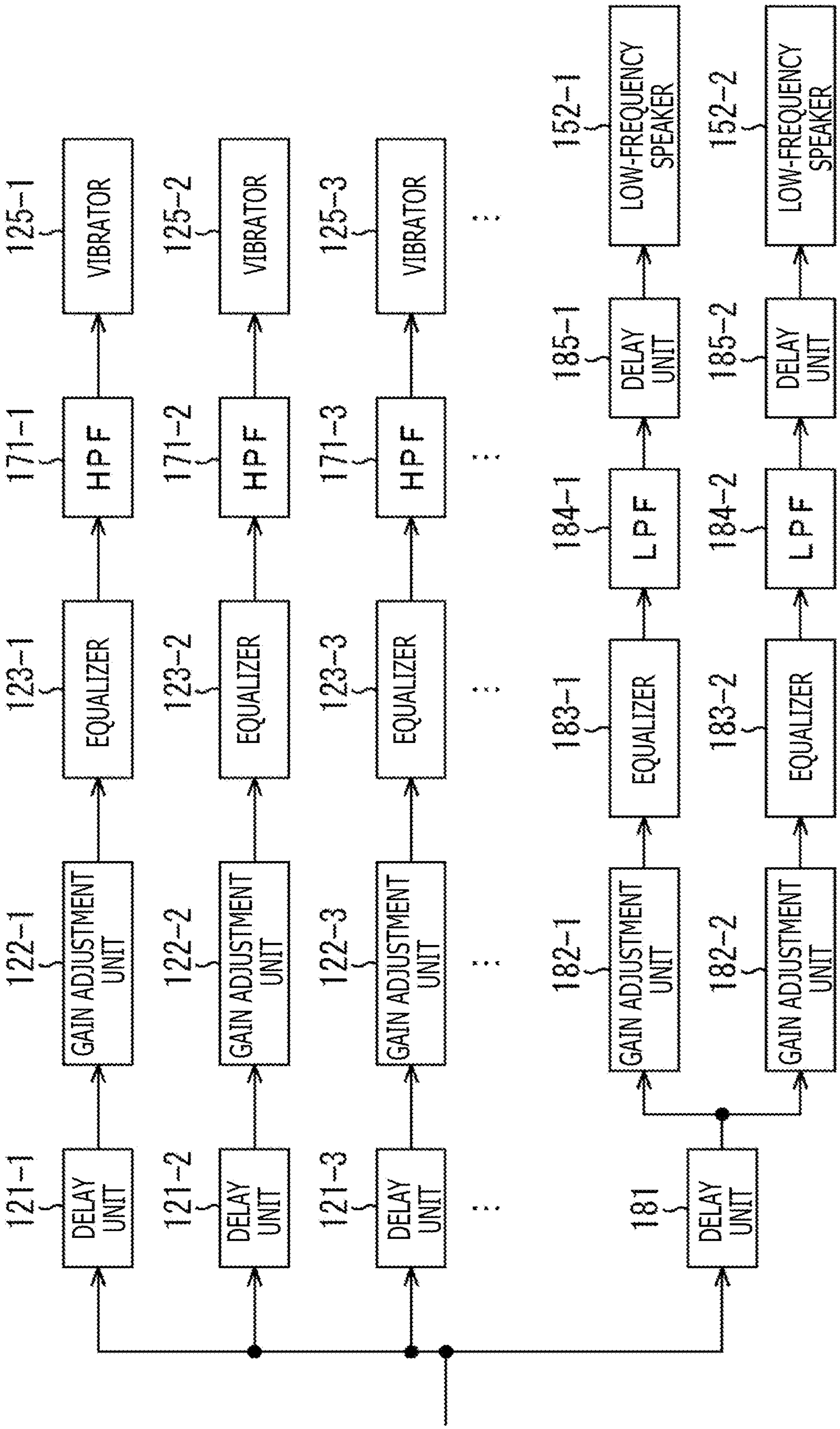
FIG. 22 is a block diagram illustrating a configuration example of the sound output unit in a case where the low-frequency speaker is provided.

FIG. 22 is a block diagram illustrating a configuration example of the sound output unit 102 in a case where the low-frequency speaker 152 is provided. In FIG. 22, the same components as the components of FIG. 19 are denoted by the same reference signs. Repetitive descriptions are omitted as appropriate.

The configuration of the sound output unit 102 illustrated in FIG. 22 is different from the configuration of the sound output unit 102 of FIG. 19 in that HPFs (High Pass Filters) 171-1 to 171-3 are provided in place of the filters 124-1 to 124-3. Further, the configuration of the sound output unit 102 illustrated in FIG. 22 is different from the configuration of the sound output unit 102 of FIG. 19 in that a delay unit 181, gain adjustment units 182-1 and 182-2, equalizers 183-1 and 183-2, LPFs (Low Pass Filters) 184-1 and 184-2, delay units 185-1 and 185-2, and the low-frequency speakers 152-1 and 152-2 are provided.

The HPFs 171-1 to 171-3 perform filtering on the sound signals supplied from the equalizers 123-1 to 123-3, to allow only high-frequency components to pass, and output the thus obtained high-frequency signals to the vibrators 125-1 to 125-3.

That is, the HPFs 171-1 to 171-3 function as high-pass filter units configured to generate high-frequency signals according to sound signals. The HPF 171 may be implemented by the equalizer 123.

The vibrators 125-1 to 125-3 vibrate in response to the high-frequency signals supplied from the HPFs 171-1 to 171-3, to vibrate the LED substrate 13 or the display module 12, thereby allowing high-frequency sound to be output from the radiating surface.

The delay unit 181 is supplied with the same sound signal as the sound signal supplied to the delay units 121-1 to 121-3. After delaying the supplied sound signal by a predetermined period of time, the delay unit 181 outputs the sound signal to the gain adjustment unit 182-1 and the gain adjustment unit 182-2.

For example, in the delay unit 181, sound signal delay processing is performed to make the sound output from the display unit 11 by the vibration of the vibrator 125 reach a viewer before the sound output from the low-frequency speaker 152-1 and the low-frequency speaker 152-2 does. Delay processing in the delay unit 181 is performed for the precedence effect.

With the precedence effect, the display apparatus 1 can make a viewer perceive the localization position of a sound image as being a position within the display unit 11. It is generally known that sound arriving from multiple directions is perceived by viewers as if the sound came from the arrival direction of the first-arriving sound, and such a phenomenon is called the "precedence effect."

Performing delay processing on sound signals to delay the sound signals more than high-frequency signals in the delay unit 181 makes it possible to output sound from the screen vibration sound output unit 151 before the low-frequency speaker 152.

This enables the sound output from the low-frequency speaker 152 to be perceived by a viewer as if the sound came from the same direction as the arrival direction of the sound output from the screen vibration sound output unit 151. That is, it is possible to localize the sound image of the sound to a position within the display unit 11.

The gain adjustment units 182-1 and 182-2 adjust the gains of the sound signals supplied from the delay unit 181 and output the gain-adjusted sound signals to the equalizers 183-1 and 183-2.

For example, in the gain adjustment units 182-1 and 182-2, the gain of a sound signal is adjusted to make the sound pressures of the sound output from the low-frequency speakers 152-1 and 152-2 be desired sound pressures such as the same sound pressure.

The equalizers 183-1 and 183-2 apply equalization processing to the sound signals supplied from gain adjustment units 182-1 and 182-2 and output the thus obtained sound signals to the LPFs 184-1 and 184-2.

For example, in the equalizers 183-1 and 183-2, equalization processing is performed to make the sound output from the low-frequency speakers 152-1 and 152-2 have desired characteristics such as flat characteristics.

The LPFs 184-1 and 184-2 perform filtering on the sound signals supplied from the equalizers 183-1 and 183-2, to allow only low-frequency components to pass, and output the thus obtained low-frequency signals to the delay units 185-1 and 185-2.

The LPF 184 functions as a low-pass filter unit configured to generate low-frequency signals according to sound signals. The LPF 184 may be implemented by the equalizer 183.

After delaying the low-frequency signals supplied from the LPFs 184-1 and 184-2 by predetermined period of times, the delay units 185-1 and 185-2 output the low-frequency signals to the low-frequency speakers 152-1 and 152-2.

For example, the delay time of the delay unit 185-1 and the delay time of the delay unit 185-2 are controlled to make the sound output from the low-frequency speaker 152-1 and the sound output from the low-frequency speaker 152-2 reach a viewer simultaneously. The same processing as delay processing performed in the delay unit 181 may be performed in the delay unit 185.

The low-frequency speakers 152-1 and 152-2 output low-frequency sound according to the low-frequency signals supplied from the delay units 185-1 and 185-2.

Second Modified Example (Exemplary Multi-Division Driving)

In the first modified example of FIG. 22, the configuration including the single screen vibration sound output unit 151 and the two low-frequency speakers 152 has been described, but the number of screen vibration sound output units and low-frequency speakers can appropriately be changed.

Figure 23:
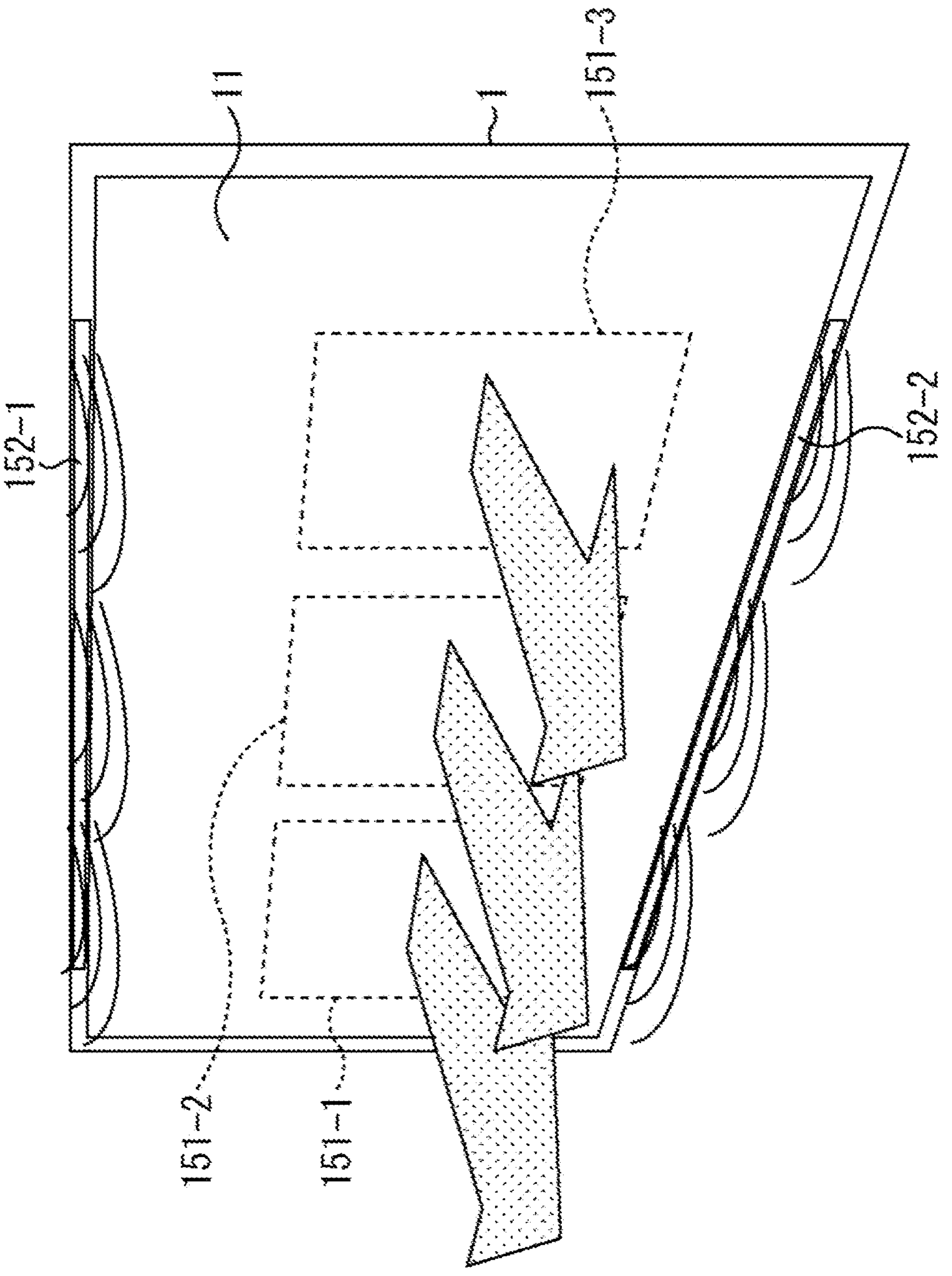
FIG. 23 is a view illustrating a second modified example of the display apparatus.

FIG. 23 is a view illustrating a second modified example of the display apparatus 1.

In FIG. 23, as a configuration for outputting high-frequency sound, three screen vibration sound output units 151-1 to 151-3 are arranged in the horizontal direction as indicated by the dashed lines.

The screen vibration sound output units 151-1 to 151-3 include configurations using any of the first to ninth vibration mechanisms being provided at the respective locations of the display unit 11, that is, left, center, and right, similarly to the screen vibration sound output unit 151. As described with reference to FIG. 21, for example, sound with frequencies equal to or more than 2 kHz is output from the screen vibration sound output units 151-1 to 151-3, and sound with frequencies equal to or less than 2 kHz is output from the low-frequency speakers 152-1 and 152-2.

In the case where the three screen vibration sound output units are placed, sound for the L channel is output from the screen vibration sound output unit 151-1, and sound for the C channel is output from the screen vibration sound output unit 151-2. Further, sound for the R channel is output from the screen vibration sound output unit 151-3.

For example, the sound output from the screen vibration sound output unit 151-1 is localized to the left-side portion of the display unit 11 as viewed by a viewer, and the sound output from the screen vibration sound output unit 151-2 is localized to the center portion of the display unit 11 as viewed by the viewer. Further, the sound output from the screen vibration sound output unit 151-3 is localized to the right-side portion of the display unit 11 as viewed by the viewer.

In such a way, in the display apparatus 1 of FIG. 23, multi-division driving is achieved, in which sound for the L, C, and R channels is output from the respective screen vibration sound output units 151-1 to 151-3.

In this case, for each of the screen vibration sound output units 151 (L, C, and R channels), directivity control is performed to match the spreading degree of the sound from the screen vibration sound output unit 151 and the spreading degree of the sound from the low-frequency speaker 152.

For example, among the speakers configuring the low-frequency speaker 152, which is an array speaker, the speaker placed on the left side mainly outputs sound for the L channel, and the speaker placed at the center mainly outputs sound for the C channel. The speaker placed on the right side mainly outputs sound for the R channel.

Performing such directivity control makes it possible to match the spreading degrees of high-frequency sound and low-frequency sound in each channel to prevent the generation of interference fringes and reduce sound interference between the channels, thereby enhancing the sound quality.

Third Modified Example (Example in which Sound Output Position is Moved)

Figure 24:
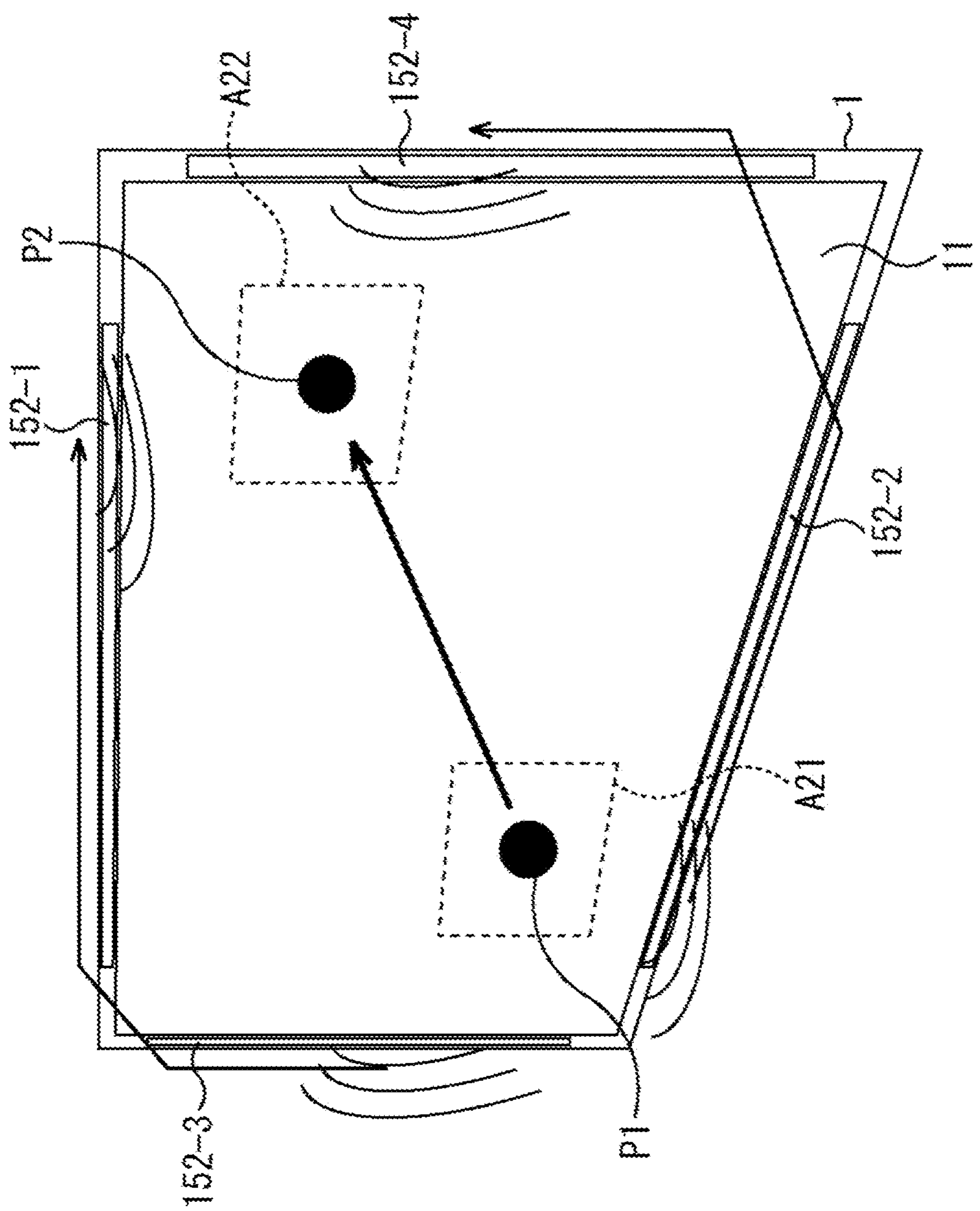
FIG. 24 is a view illustrating a third modified example of the display apparatus.

FIG. 24 is a view illustrating a third modified example of the display apparatus 1.

In FIG. 24, as the low-frequency speaker 152, low-frequency speakers 152-1 to 152-4 are provided. The screen vibration sound output unit 151 is provided over the entire display unit 11.

The low-frequency speaker 152-1 and the low-frequency speaker 152-2 are provided in the upper frame portion and the lower frame portion, respectively, to be adjacent to the display unit 11, as in FIG. 20. The low-frequency speaker 152-3 is provided in the left frame portion to be adjacent to the display unit 11, and the low-frequency speaker 152-4 is provided in the right frame portion to be adjacent to the display unit 11.

Also in the example of FIG. 24, high-frequency sound is output from the screen vibration sound output unit 151, and low-frequency sound is output from the low-frequency speaker 152.

An image with a moving subject (object) is sometimes displayed. In the display apparatus 1 of FIG. 24, the processing of moving, in conjunction with the movement of an object, the sound output position (sound source) on the display unit 11 as indicated by the bold arrow is performed. The movement of a sound output position is performed in reference to position information indicating the position of a moving sound source at each time, for example.

For example, it is assumed that, at a certain time, high-frequency sound is being output from an area A21 of the screen vibration sound output unit 151 to localize the sound image to a position P1 on the lower left of the display unit 11.

At this time, low-frequency sound for localizing the sound image to the position P1 is output from the low-frequency speakers 152-1 to 152-4. For example, control is performed such that sound is mainly output from the low-frequency speaker 152-2 and the low-frequency speaker 152-3 located close to the position P1 and almost no sound is output from the low-frequency speaker 152-1 and the low-frequency speaker 152-4.

In such a state, in a case where the position of the object moves from the position P1 to a position P2, high-frequency sound is output from an area A22 of the screen vibration sound output unit 151. This makes a viewer perceive as if the sound output position of high-frequency sound moved from the position P1 to the position P2.

Further, low-frequency sound for localizing the sound image to the position P2 in line with the movement of the sound output position of high-frequency sound is output from the low-frequency speakers 152-1 to 152-4. For example, control is performed such that, with the lapse of time, more sound is output from the low-frequency speaker 152-1 and the low-frequency speaker 152-4 located close to the position P2 and less sound is output from the low-frequency speaker 152-2 and the low-frequency speaker 152-3.

In such a way, combining the screen vibration sound output unit 151 and the low-frequency speakers 152-1 to 152-4 makes it possible to localize, even in a case where an object moves, the sound image to any position.

Note that, position information indicating the position of a sound source may be input by a user or the like or prepared in advance as sound signal metadata. For example, in object audio, sound signal metadata concerning each object includes position information indicating the position of the object in space.

A DNN (Deep Neural Network) whose input is at least one of the image and sound signal of content and output is position information may be trained in advance, and the display apparatus 1 may generate position information by using the DNN.

Others

Although the case where the image display unit 12*a* of the display module 12 includes the LED substrate 13 has been described, the image display unit 12*a* may include a light source substrate having placed thereon light source elements other than LEDs.

In the above, the display apparatus 1 has been described as an apparatus configured to output sound. The sound to be output by the display apparatus 1 includes not only human voices but also various types of sound such as music, sound effects, and BGM.

Note that, the effects described herein are only exemplary and not limitative, and other effects may be provided.

The embodiments of the present technology are not limited to the embodiment described above, and various modifications can be made without departing from the gist of the present technology.

Exemplary Configuration Combination

The present technology can also have the following configurations.

(1)

A display apparatus including:

a display unit that is configured to display an image and includes display modules combined, the display modules each including multiple light source substrates; and a screen vibration sound output unit configured to vibrate the light source substrates or the display modules from a back side by a vibrator, thereby allowing the display unit to output sound.

(2)

The display apparatus according to (1) above, in which the vibrator includes a piezoelectric actuator.

(3)

The display apparatus according to (2) above, in which the piezoelectric actuator is a planar stacked piezoelectric actuator provided on a back side of each of the light source substrates.

(4)

The display apparatus according to (3) above, in which the planar stacked piezoelectric actuator is directly fixed to a back of each of the light source substrates.

(5)

The display apparatus according to (3) above, in which the planar stacked piezoelectric actuator is fixed through a boss provided on a back of each of the light source substrates.

(6)

The display apparatus according to (2) above, in which the piezoelectric actuator is a stacked piezoelectric actuator provided on a back side of each of the light source substrates or the display modules and configured to vibrate a corresponding one of the light source substrates or a corresponding one of the display modules by elongating or contracting.

(7)

The display apparatus according to (6) above, in which each of the light source substrates is mounted on the stacked piezoelectric actuator by a magnet.

(8)

The display apparatus according to (6) above, in which the stacked piezoelectric actuator is pressed against a back of the corresponding one of the display modules.

(9)

The display apparatus according to (8) above, in which the screen vibration sound output unit includes the stacked piezoelectric actuator in plural number.

(10)

The display apparatus according to (8) above, in which the stacked piezoelectric actuator is inserted from outside of a cabinet including the corresponding one of the display modules, through an opening formed in the cabinet.

(11)

The display apparatus according to (10) above, in which an external unit including the stacked piezoelectric actuator incorporates equipment configured to correct acoustic characteristics of the stacked piezoelectric actuator.

(12)

The display apparatus according to (10) above, in which the screen vibration sound output unit includes the stacked piezoelectric actuator in plural number.

(13)

The display apparatus according to (12) above, in which an external unit including the multiple stacked piezoelectric actuators incorporates equipment configured to correct acoustic characteristics of the multiple stacked piezoelectric actuators.

(14)

The display apparatus according to any one of (1) through (13) above, further including:

multiple low-frequency speakers that are provided on a frame member configured to surround the display unit and are configured to output sound based on a low-frequency component of a sound signal, in which the screen vibration sound output unit outputs sound based on a high-frequency component of the sound signal.

(15)

The display apparatus according to (14) above, further including:

a delay unit configured to perform delay processing to delay the low-frequency component of the sound signal more than the high-frequency component of the sound signal.

(16)

The display apparatus according to (14) or (15) above, in which the screen vibration sound output unit is provided in plural number.

(17)

The display apparatus according to (14) or (15) above, in which the screen vibration sound output unit allows the sound to be output from a position of a subject appearing in the image on the display unit.

(18)

An output method including:

causing a display apparatus including a display unit including display modules which are combined and each of which includes multiple light source substrates to display an image, and vibrate the light source substrates or the display modules from a back side by a vibrator, thereby allowing the display unit to output sound.

(19)

A display module including:

an image display unit including multiple light source substrates combined; and a screen vibration sound output unit configured to vibrate the light source substrates from a back side by a vibrator, thereby allowing the image display unit to output sound.

REFERENCE SIGNS LIST

1: Display apparatus
11: Display unit
12: Display module
**12*a***: Image display unit
13: LED substrate
21: Vibrator
32: Boss
33: Chassis
34: Module frame
41: Vibrator
51: Back frame
52: Spring
61: Opening
62: External vibration box
63: Equipment
101: Control unit
102: Sound output unit
151: Screen vibration sound output unit
152-1 to 152-4: Low-frequency speaker
181: Delay unit

The invention claimed is:

1. A display apparatus comprising:

a display unit that is configured to display an image and includes display modules combined, the display modules each including multiple light source substrates; and a screen vibration sound output unit configured to vibrate the light source substrates or the display modules from a back side by a vibrator, thereby allowing the display unit to output sound, wherein the vibrator includes a piezoelectric actuator, wherein the piezoelectric actuator is a stacked piezoelectric actuator provided on a back side of each of the light source substrates or the display modules and configured to vibrate a corresponding one of the light source substrates or a corresponding one of the display modules by elongating or contracting, wherein the stacked piezoelectric actuator is pressed against a back of the corresponding one of the display modules, wherein the stacked piezoelectric actuator is inserted from outside of a cabinet including the corresponding one of the display modules, through an opening formed in the cabinet, and wherein an external unit including the stacked piezoelectric actuator incorporates equipment configured to correct acoustic characteristics of the stacked piezoelectric actuator.

2. The display apparatus according to claim 1, wherein the planar stacked piezoelectric actuator is directly fixed to a back of each of the light source substrates.

3. The display apparatus according to claim 1, wherein the planar stacked piezoelectric actuator is fixed through a boss provided on a back of each of the light source substrates.

4. The display apparatus according to claim 1, wherein each of the light source substrates is mounted on the stacked piezoelectric actuator by a magnet.

5. The display apparatus according to claim 1, wherein the screen vibration sound output unit includes the stacked piezoelectric actuator in plural number.

6. The display apparatus according to claim 1, further comprising:

multiple low-frequency speakers that are provided on a frame member configured to surround the display unit and are configured to output sound based on a low-frequency component of a sound signal, wherein the screen vibration sound output unit outputs sound based on a high-frequency component of the sound signal.

7. The display apparatus according to claim 6, further comprising:

a delay unit configured to perform delay processing to delay the low-frequency component of the sound signal more than the high-frequency component of the sound signal.

8. The display apparatus according to claim 6, wherein the screen vibration sound output unit is provided in plural number.

9. The display apparatus according to claim 6, wherein the screen vibration sound output unit allows the sound to be output from a position of a subject appearing in the image on the display unit.

10. A display apparatus comprising:

a display unit that is configured to display an image and includes display modules combined, the display modules each including multiple light source substrates; and a screen vibration sound output unit configured to vibrate the light source substrates or the display modules from a back side by a vibrator, thereby allowing the display unit to output sound, wherein the vibrator includes a piezoelectric actuator, wherein the piezoelectric actuator is a stacked piezoelectric actuator provided on a back side of each of the light source substrates or the display modules and configured to vibrate a corresponding one of the light source substrates or a corresponding one of the display modules by elongating or contracting, wherein the stacked piezoelectric actuator is pressed against a back of the corresponding one of the display modules, wherein the stacked piezoelectric actuator is inserted from outside of a cabinet including the corresponding one of the display modules, through an opening formed in the cabinet, wherein the screen vibration sound output unit includes the stacked piezoelectric actuator in plural number, and wherein an external unit including the multiple stacked piezoelectric actuators incorporates equipment configured to correct acoustic characteristics of the multiple stacked piezoelectric actuators.

* * * * *